US012663752B2

(12) United States Patent
Sato

(10) Patent No.: US 12,663,752 B2
(45) Date of Patent: Jun. 23, 2026

(54) IMAGE FORMING APPARATUS INCLUDING DRUM CARTRIDGE AND TONER CARTRIDGE PIVOTALLY MOVABLE RELATIVE TO DRUM CARTRIDGE

(71) Applicant: BROTHER KOGYO KABUSHIKI KAISHA, Nagoya (JP)

(72) Inventor: Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/775,619

(22) Filed: Jul. 17, 2024

(65) Prior Publication Data

US 2025/0036075 A1 Jan. 30, 2025

(30) Foreign Application Priority Data

Jul. 27, 2023 (JP) ................................ 2023-122903

(51) Int. Cl.
*G03G 21/18* (2006.01)
*G03G 15/00* (2006.01)
*G03G 21/16* (2006.01)

(52) U.S. Cl.
CPC ..... *G03G 21/1825* (2013.01); *G03G 15/6502* (2013.01); *G03G 15/6558* (2013.01); *G03G 21/1633* (2013.01); *G03G 21/1814* (2013.01); *G03G 21/1832* (2013.01); *G03G 21/1842* (2013.01)

(58) Field of Classification Search
CPC ........... G03G 21/1825; G03G 21/1842; G03G 15/6558
See application file for complete search history.

(56) References Cited

U.S. PATENT DOCUMENTS 6,101,350 A * 8/2000 Suzuki ............... G03G 15/0896 399/119
2002/0028088 A1* 3/2002 Okabe ................ G03G 21/1832 399/116
2007/0258733 A1* 11/2007 Yoshida ............ G03G 15/0893 399/281

(Continued)

FOREIGN PATENT DOCUMENTS

JP 2016-110097 A 6/2016
JP 2018-025571 A 2/2018

(Continued)

*Primary Examiner* — Sevan A Aydin
(74) *Attorney, Agent, or Firm* — Merchant & Gould P.C.

(57) ABSTRACT

An image forming apparatus includes a main body housing, a drum cartridge, and a toner cartridge. The drum cartridge is movable inside the main body housing between a drum first position and a drum second position. The toner cartridge is movable between a toner first position and a toner second position in a state where the toner cartridge is coupled to the drum cartridge. In a state where the toner cartridge is coupled to the drum cartridge, the drum cartridge is at the drum second position, and the toner cartridge is at the toner second position, the toner cartridge is pivotally movable relative to the drum cartridge between a first pivot position at which coupling of the toner cartridge to the drum cartridge is not releasable and a second pivot position at which the coupling of the toner cartridge to the drum cartridge is releasable.

13 Claims, 20 Drawing Sheets

(56) References Cited

U.S. PATENT DOCUMENTS

| | | | | |
|---|---|---|---|---|
| 2009/0092413 | A1* | 4/2009 | Okabe | G03G 21/1814 399/119 |
| 2016/0154341 | A1 | 6/2016 | Hamada et al. | |
| 2020/0341427 | A1* | 10/2020 | Komatsu | G03G 21/1814 |
| 2021/0003964 | A1* | 1/2021 | Sato | G03G 21/1817 |
| 2021/0063958 | A1 | 3/2021 | Taguchi et al. | |
| 2021/0191311 | A1 | 6/2021 | Sato et al. | |
| 2022/0011691 | A1 | 1/2022 | Sato | |
| 2022/0276604 | A1* | 9/2022 | Sato | G03G 21/1853 |

FOREIGN PATENT DOCUMENTS

| | | | |
|---|---|---|---|
| JP | 2021-039214 | A | 3/2021 |
| JP | 2021-101210 | A | 7/2021 |
| JP | 2022-015016 | A | 1/2022 |

* cited by examiner

IMAGE FORMING APPARATUS INCLUDING DRUM CARTRIDGE AND TONER CARTRIDGE PIVOTALLY MOVABLE RELATIVE TO DRUM CARTRIDGE

REFERENCE TO RELATED APPLICATIONS

This application claims priority from Japanese Patent Application No. 2023-122903 filed on Jul. 27, 2023. The entire content of the priority application is incorporated herein by reference.

BACKGROUND ART

A conventional image forming apparatus is provided with an apparatus body and a process cartridge. The process cartridge is attached to the apparatus body. The process cartridge includes a photosensitive drum and a developing roller and can store toner therein.

SUMMARY

In the conventional image forming apparatus, when the residual amount of toner in the process cartridge becomes low, the entire process cartridge including the photosensitive drum needs to be replaced with a new one even though there is no necessity of replacing the photosensitive drum, thus making it difficult to achieve cost reduction.

In view of the foregoing, it is an object of the present disclosure to provide an image forming apparatus in which a toner cartridge and a drum cartridge having a photosensitive drum can be replaced with new ones individually.

In order to attain the above and other objects, according to one aspect, the present disclosure provides an image forming apparatus including a main body housing, a drum cartridge, and a toner cartridge. The main body housing has an opening. The drum cartridge includes a photosensitive drum. The drum cartridge is movable inside the main body housing between a drum first position and a drum second position. The drum second position is closer to the opening than the drum first position is to the opening. The toner cartridge is configured to store therein toner. The toner cartridge is movable between a toner first position and a toner second position in a state where the toner cartridge is coupled to the drum cartridge. The toner cartridge is at the toner first position in a state where the drum cartridge is at the drum first position. The toner cartridge is at the toner second position in a state where the drum cartridge is at the drum second position. The main body housing includes a drum cartridge guide and a toner cartridge guide. The drum cartridge guide is configured to guide the drum cartridge. The toner cartridge guide is configured to guide the toner cartridge. Both in the state where the drum cartridge is at the drum first position and in the state where the drum cartridge is at the drum second position, a portion of the drum cartridge is fitted in the drum cartridge guide. In a state where the toner cartridge is coupled to the drum cartridge, the drum cartridge is at the drum second position, and the toner cartridge is at the toner second position, the toner cartridge is disengaged from the toner cartridge guide. In the state where the toner cartridge is coupled to the drum cartridge, the drum cartridge is at the drum second position, and the toner cartridge is at the toner second position, the toner cartridge is pivotally movable relative to the drum cartridge between a first pivot position and a second pivot position. In a state where the tone cartridge is at the first pivot position, coupling of the toner cartridge to the drum cartridge is not releasable. In a state where the tone cartridge is at the second pivot position, the coupling of the toner cartridge to the drum cartridge is releasable.

In the above structure, in a state where the toner cartridge is coupled to the drum cartridge, the drum cartridge is at the drum second position, and the toner cartridge is at the toner second position, the coupling of the toner cartridge to the drum cartridge becomes releasable by placing the toner cartridge in the second pivot position relative to the drum cartridge. With this configuration, the toner cartridge can be removed from the main body housing with the drum cartridge left in the drum second position. As a result, the drum cartridge and the toner cartridge can be replaced with new ones individually.

DESCRIPTION

1. Outline of Image Forming Apparatus

The outline of an image forming apparatus 1 will be described with reference to FIGS. 1 and 2.

Figure 1:
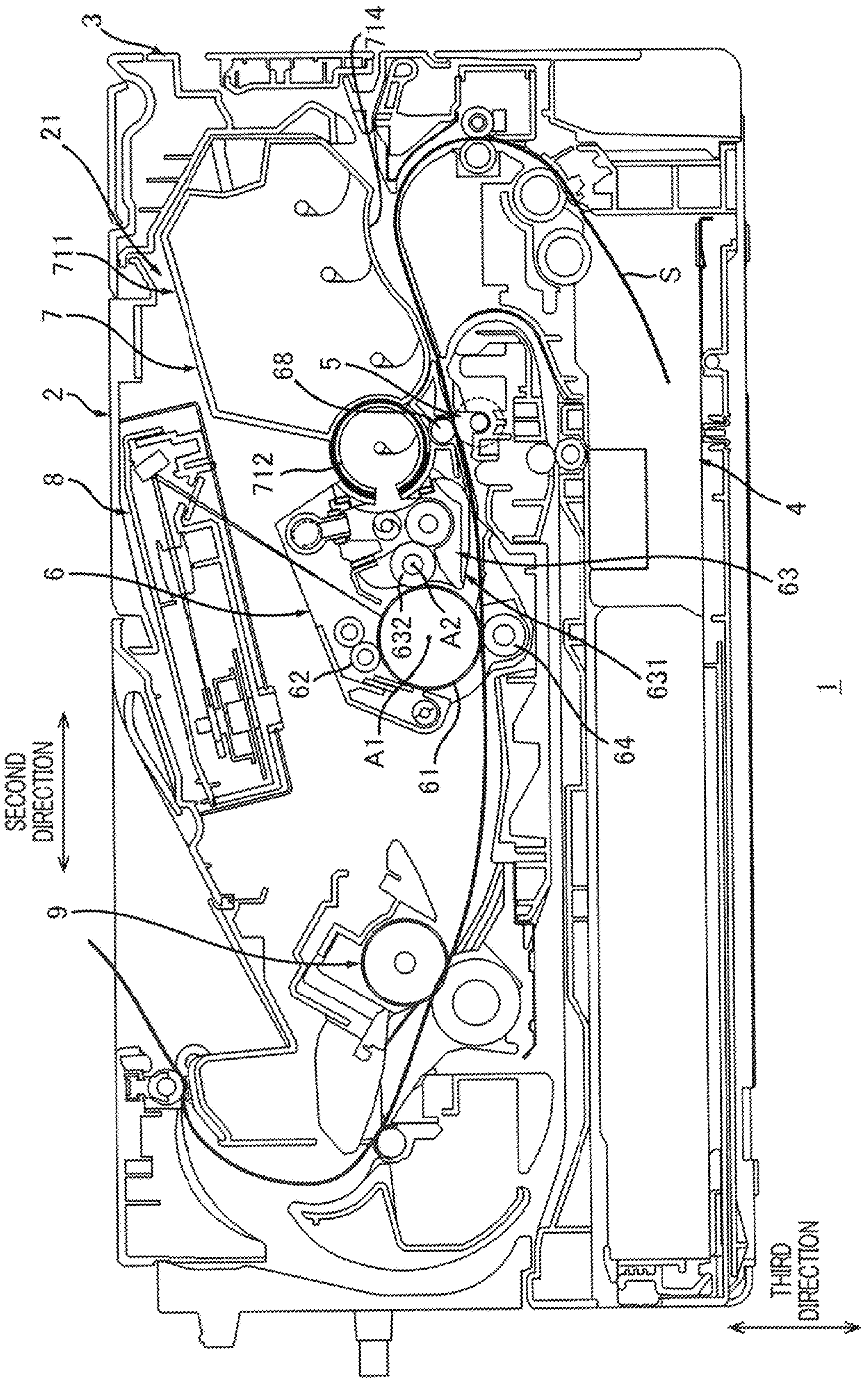
FIG. 1 is a schematic configuration diagram illustrating an image forming apparatus.

As illustrated in FIG. 1, the image forming apparatus 1 includes a main body housing 2, a cover 3, a sheet storage section 4, a conveying roller 5, a drum cartridge 6, a toner cartridge 7, an exposing device 8, and a fixing device 9.

1.1 Main Body Housing 2

The main body housing 2 houses therein the sheet storage section 4, conveying roller 5, drum cartridge 6, toner cartridge 7, exposing device 8, and fixing device 9. The main body housing 2 has an opening 21.

1.2 Cover 3

The cover 3 is configured to open and close the opening 21. For more details, as illustrated in FIGS. 1 and 2, the cover 3 is movable between a cover closing position (see FIG. 1) and a cover opening position (see FIG. 2). As illustrated in FIG. 1, the cover 3 closes the opening 21 in a state where the cover 3 is located at the cover closing position. As illustrated in FIG. 2, the cover 3 opens the opening 21 in a state where the cover 3 is located at the cover opening position.

1.3 Sheet Storage Section 4

As illustrated in FIG. 1, the sheet storage section 4 is configured to store therein a sheet S. The sheet S in the sheet storage section 4 is conveyed toward the conveying roller 5.

1.4 Conveying Roller 5

The conveying roller 5 is configured to convey, toward a photosensitive drum 61, the sheet S conveyed from the sheet storage section 4. The photosensitive drum 61 will be described later.

1.5 Drum Cartridge 6

Figure 2:
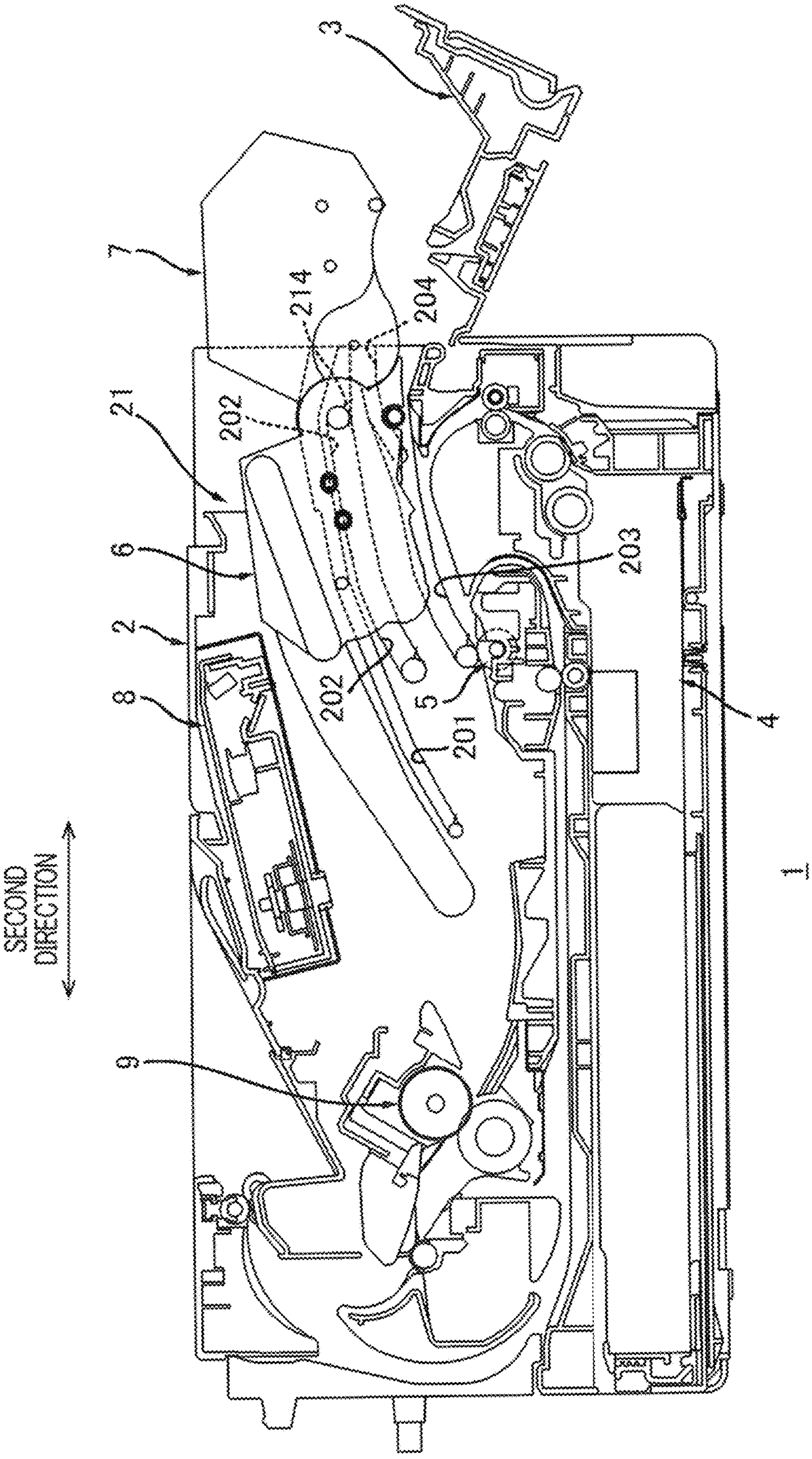
FIG. 2 is a view illustrating a state where a drum cartridge illustrated in FIG. 1 is located at a drum second position and a toner cartridge illustrated in FIG. 1 is located at a toner second position.

As illustrated in FIGS. 1 and 2, the drum cartridge 6 is movable inside the main body housing 2 between a drum first position (see FIG. 1) and a drum second position (see FIG. 2). The image forming apparatus 1 can perform image formation in a state where the drum cartridge 6 is located at the drum first position. The drum cartridge 6 at the drum second position is positioned closer to the opening 21 than the drum cartridge 6 at the drum first position is to the opening 21. In other words, the drum second position is closer to the opening 21 than the drum first position is to the opening. The image forming apparatus 1 cannot perform image formation in a state where the drum cartridge 6 is located at the drum second position.

The drum cartridge 6 includes the photosensitive drum 61, a charging roller 62, a developing unit 63, and a transfer roller 64.

1.5.1 Photosensitive Drum 61

The photosensitive drum 61 has a cylindrical shape. The photosensitive drum 61 extends in a first direction. The photosensitive drum 61 is rotatable about an axis A1. The axis A1 extends in the first direction.

1.5.2 Charging Roller 62

The charging roller 62 is configured to charge the photosensitive drum 61. The drum cartridge 6 may include a scorotron charger in place of the charging roller 62.

1.5.3 Developing Unit 63

The developing unit 63 includes a developing housing 631 and a developing roller 632. In other words, the drum cartridge 6 includes the developing housing 631 and developing roller 632.

The developing housing 631 is configured to store toner fed from the toner cartridge 7.

The developing roller 632 is configured to supply toner stored in the developing housing 631 to the photosensitive drum 61. The developing roller 632 is supported by the developing housing 631. For more details, the developing roller 632 is supported by one end portion of the developing housing 631 in a second direction. The second direction crosses the first direction. Preferably, the second direction is orthogonal to the first direction. The developing roller 632 contacts the photosensitive drum 61. The developing roller 632 may be configured to contact the photosensitive drum 61 and separate from the photosensitive drum 61 and vice versa. The developing roller 632 extends in the first direction. The developing roller 632 is rotatable about an axis A2. The axis A2 extends in the first direction.

1.5.5 Transfer Roller 64

The transfer roller 64 contacts the peripheral surface of the photosensitive drum 61. The transfer roller 64 is positioned between the photosensitive drum 61 and the sheet storage section 4 in a third direction in a state where the drum cartridge 6 is located at the drum first position. The third direction crosses both the first direction and the second direction. Preferably, the third direction is orthogonal to both the first direction and the second direction. The sheet S conveyed by the conveying roller 5 passes between the transfer roller 64 and the photosensitive drum 61 in a state where the drum cartridge 6 is located at the drum first position. At this time, the transfer roller 64 is configured to transfer toner on the photosensitive drum 61 onto the sheet S.

1.6 Toner Cartridge 7

The toner cartridge 7 is configured to store therein toner. The toner cartridge 7 is configured to be coupled to the drum cartridge 6. That is, the toner cartridge 7 can be coupled to the drum cartridge 6. In a state where the toner cartridge 7 is coupled to the drum cartridge 6, the toner cartridge 7 is movable between a toner first position (see FIG. 1) and a toner second position (see FIG. 2) together with the drum cartridge 6.

As illustrated in FIG. 1, in a state where the toner cartridge 7 is coupled to the drum cartridge 6 and the drum cartridge 6 is located at the drum first position, the toner cartridge 7 is located at the toner first position. In other words, in a state where the toner cartridge 7 is located at the toner first position, the toner cartridge 7 is coupled to the drum cartridge 6 located at the drum first position. The toner cartridge 7 can supply toner stored in the toner cartridge 7 to the developing housing 631 of the drum cartridge 6 in a state where the toner cartridge 7 is coupled to the drum cartridge 6, the drum cartridge 6 is located at the drum first position, and the toner cartridge 7 is located at the toner first position.

As illustrated in FIG. 2, in a state where the toner cartridge 7 is coupled to the drum cartridge 6 and the drum cartridge 6 is located at the drum second position, the toner cartridge 7 is located at the toner second position. In other words, in a state where the toner cartridge 7 is located at the toner second position, the toner cartridge 7 is coupled to the drum cartridge 6 located at the drum second position. The toner cartridge 7 does not supply toner stored in the toner cartridge 7 to the developing housing 631 of the drum cartridge 6 in a state where the toner cartridge 7 is coupled to the drum cartridge 6, the drum cartridge 6 is located at the drum second position, and the toner cartridge 7 is located at the toner second position.

1.7 Exposing Device 8

As illustrated in FIG. 1, the exposing device 8 is configured to expose the photosensitive drum 61 to light. For more details, in a state where the drum cartridge 6 is located at the drum first position, the exposing device 8 can expose to light the surface of the photosensitive drum 61 that has been charged by the charging roller 62. The developing roller 632 supplies toner to the exposed surface of the photosensitive drum 61. In the present embodiment, the exposing device 8 is a laser scan unit. The exposing device 8 may be an LED head.

1.8 Fixing Device 9

The fixing device 9 is positioned apart from the cover 3 in the second direction. The fixing device 9 is configured to fix toner that has been transferred onto the sheet S to the sheet S. In the present embodiment, the fixing device 9 applies heat and pressure to the sheet S onto which toner has been transferred to thereby fix the toner onto the sheet S. The sheet S that has passed through the fixing device 9 is discharged to the upper surface of the main body housing 2.

2. Details of Drum Cartridge 6

Details of the drum cartridge 6 will be described with reference to FIG. 1 and FIGS. 3 to 8. Hereinafter, in the description of the drum cartridge 6, the "first direction", "second direction", and "third direction" are defined in a state where the drum cartridge 6 is located at the drum first position.

Figure 3:
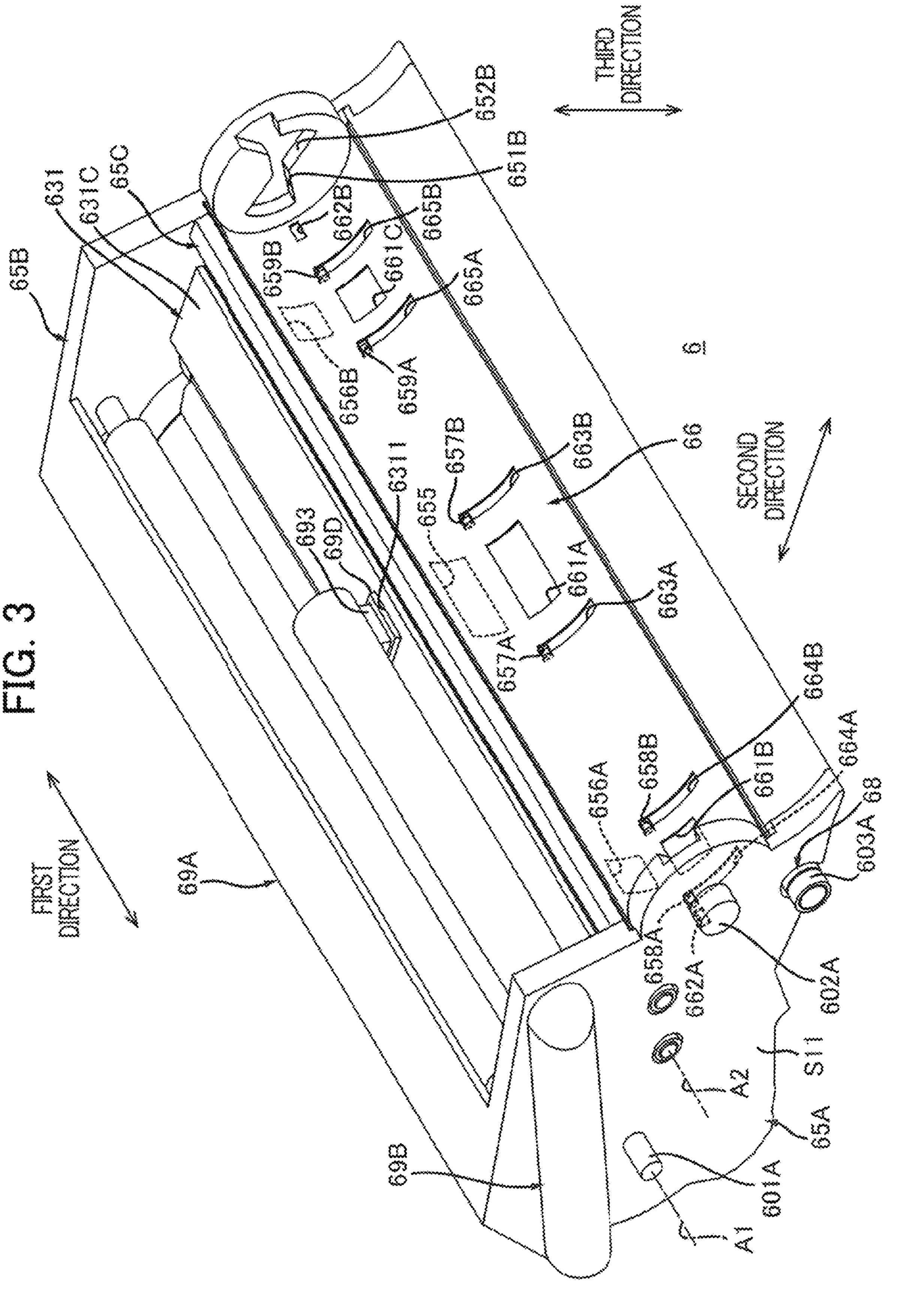
FIG. 3 is a perspective view of the drum cartridge illustrated in FIG. 1.

As illustrated in FIG. 3, the drum cartridge 6 includes a first frame 65A, a second frame 65B, a third frame 65C, a developing shutter 66, a seal member 67 (see FIG. 6), an opposing roller 68, a drum cleaner 69A, a collected toner pipe 69B, a collected toner conveying member 69C (see FIG. 4), a seal member 69D (see FIG. 6), and a plurality of protrusions 601A, 601B, 602A, 602B, 603A, and 603B (see FIG. 4) in addition to the above-described photosensitive drum 61, charging roller 62, developing unit 63, and transfer roller 64.

2.1 First Frame 65A

Figure 4:
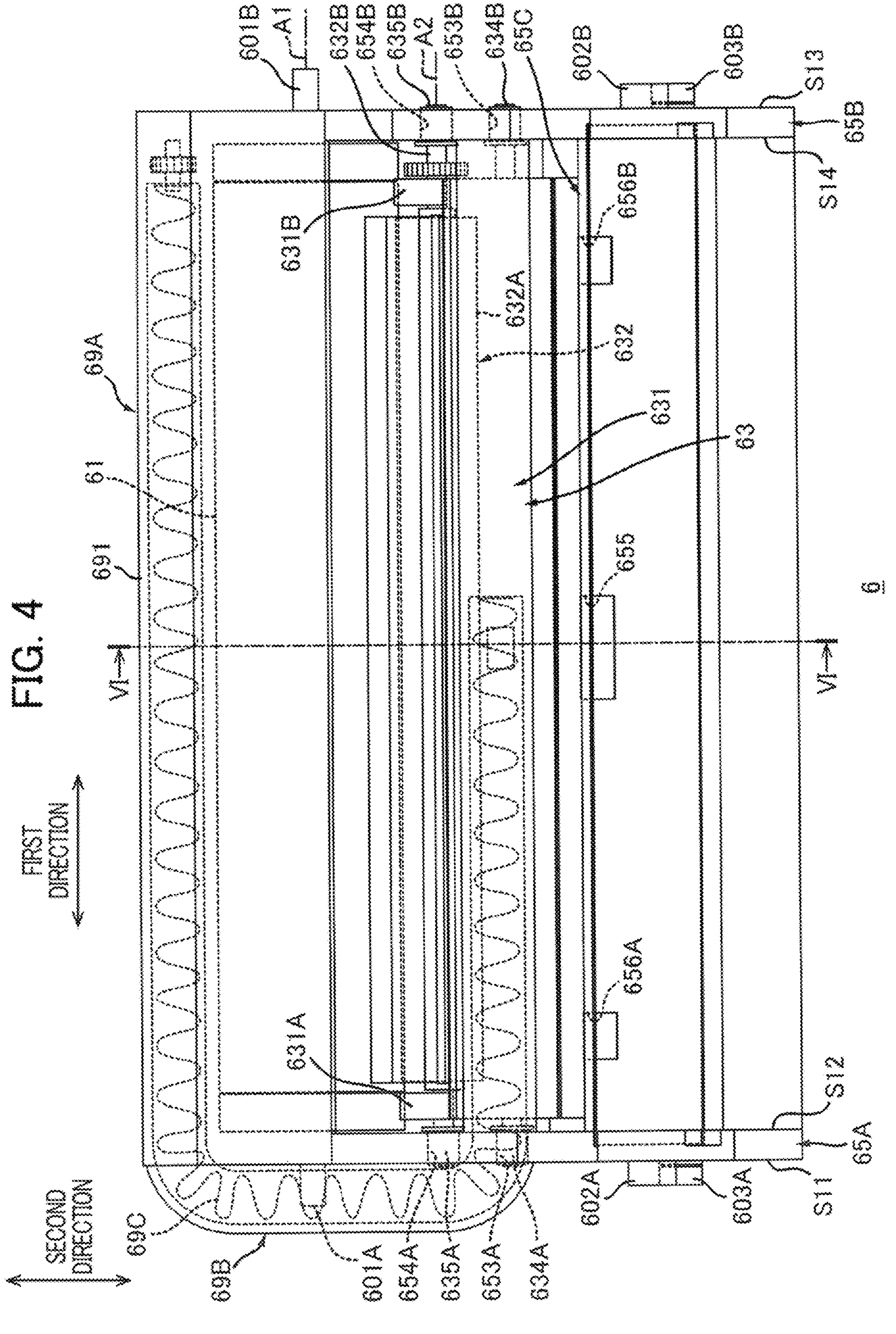
FIG. 4 is a plan view of the drum cartridge illustrated in FIG. 3.

As illustrated in FIG. 4, the first frame 65A is positioned at one end portion of the drum cartridge 6 in the first direction. The first frame 65A supports one end portion of the photosensitive drum 61 in the first direction. The first frame 65A extends in both the second direction and the third direction. The first frame 65A has an outer surface S11 and an inner surface S12.

Figure 5:
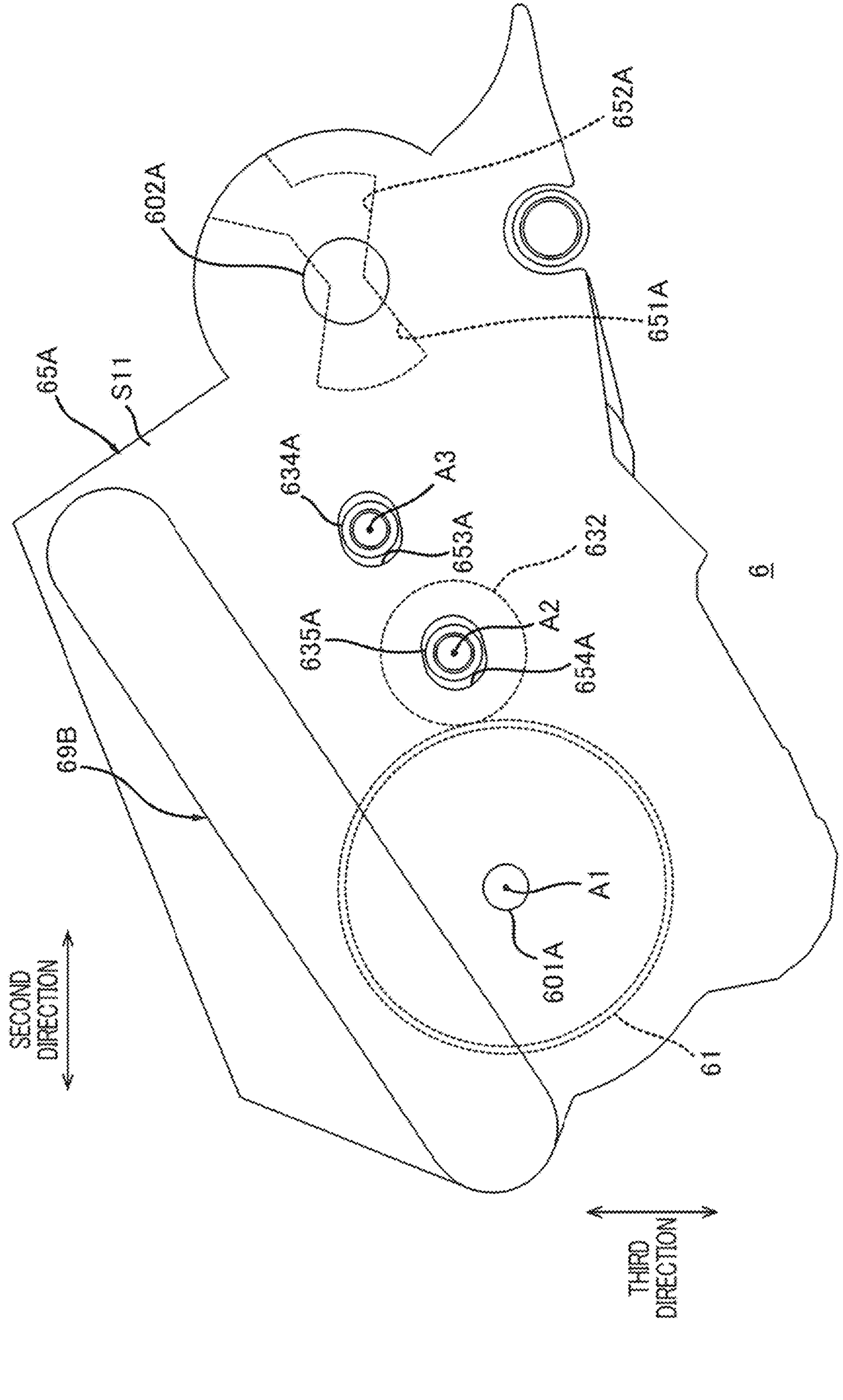
FIG. 5 is a side view of the drum cartridge illustrated in FIG. 3.

As illustrated in FIG. 5, the first frame 65A has a guide part 651A, a locking part 652A, a through hole 653A, and a through hole 654A.

The guide part 651A is positioned in the inner surface S12 of the first frame 65A. The guide part 651A is a groove. The guide part 651A extends in a direction crossing the first direction, the second direction, and the third direction. Preferably, the guide part 651A extends in a direction orthogonal to the first direction and crossing both the second direction and the third direction.

The locking part 652A is positioned in the inner surface S12 of the first frame 65A. The locking part 652A is a groove. The locking part 652A extends in a direction crossing the guide part 651A. The locking part 652A extends in the second direction.

The through hole 653A is positioned apart from the photosensitive drum 61 in a direction connecting the axis A1 and the axis A2. The through hole 653A is positioned between the protrusion 601A and the protrusion 602A in the direction connecting the axis A1 and the axis A2. The through hole 653A extends in the direction connecting the axis A1 and the axis A2.

The through hole 654A is positioned between the photosensitive drum 61 and the through hole 653A in the direction connecting the axis A1 and the axis A2. The through hole 654A is positioned between the protrusion 601A and the through hole 653A in the direction connecting the axis A1 and the axis A2. The through hole 654A extends in the direction connecting the axis A1 and the axis A2.

2.2 Second Frame 65B

As illustrated in FIG. 4, the second frame 65B is positioned at the other end portion of the drum cartridge 6 in the first direction. The second frame 65B is positioned apart from the first frame 65A in the first direction. The second frame 65B supports the other end portion of the photosensitive drum 61 in the first direction. The second frame 65B extends in both the second direction and the third direction. The second frame 65B has an outer surface S13 and an inner surface S14.

Figure 6:
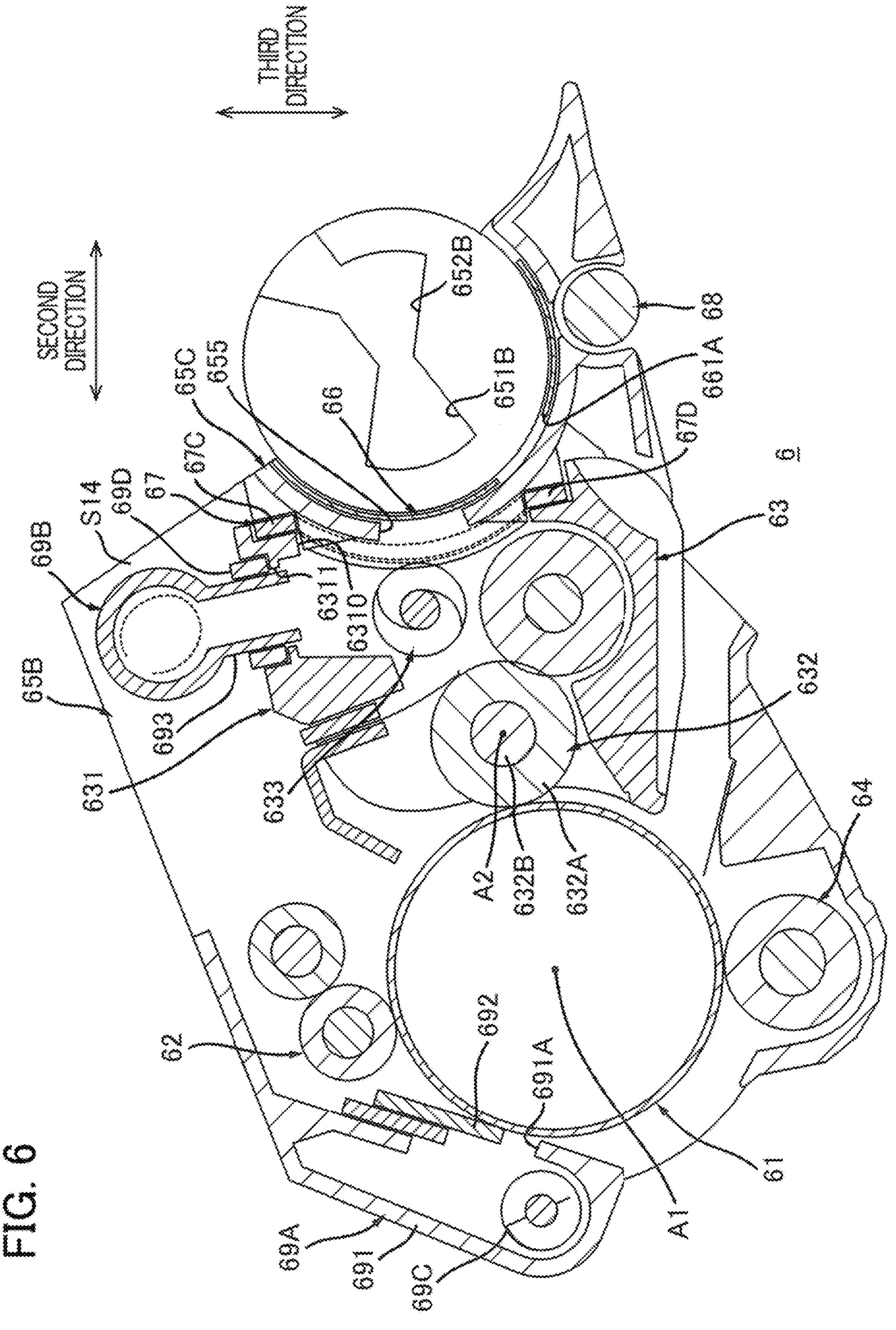
FIG. 6 is a cross-sectional view of the drum cartridge taken along line VI-VI of FIG. 4.

As illustrated in FIG. 6, the second frame 65B has a guide part 651B, a locking part 652B, a through hole 653B (see FIG. 4), and a through hole 654B (see FIG. 4).

The guide part 651B is positioned in the inner surface S14 of the second frame 65B. The guide part 651B is a groove. The guide part 651B extends in the same direction as the extending direction of the guide part 651A.

The locking part 652B is positioned in the inner surface S14 of the second frame 65B. The locking part 652B is a groove. The locking part 652B extends in a direction crossing the guide part 651B. The locking part 652B extends in the same direction as the extending direction of the locking part 652A.

As illustrated in FIG. 4, the through hole 653B is positioned apart from the photosensitive drum 61 in the direction connecting the axis A1 and the axis A2. The through hole 653B is positioned between the protrusion 601B and the protrusion 602B in the direction connecting the axis A1 and the axis A2. The through hole 653B extends in the direction connecting the axis A1 and the axis A2.

The through hole 654B is positioned between the photosensitive drum 61 and the through hole 653B in the direction connecting the axis A1 and the axis A2. The through hole 654B is positioned between the protrusion 601B and the through hole 653B in the direction connecting the axis A1 and the axis A2. The through hole 654B extends in the direction connecting the axis A1 and the axis A2.

2.3 Third Frame 65C

As illustrated in FIG. 6, the third frame 65C is positioned on the opposite side of the developing housing 631 from the photosensitive drum 61 in the second direction.

As illustrated in FIGS. 3 and 4, the third frame 65C is positioned between the first frame 65A and the second frame 65B in the first direction. The third frame 65C extends in the first direction. One end portion of the third frame 65C in the first direction is connected to the first frame 65A. The other end portion of the third frame 65C in the first direction is connected to the second frame 65B. The one end portion of the third frame 65C in the first direction is fixed to the first frame 65A. The other end portion of the third frame 65C in the first direction is fixed to the second frame 65B. With this configuration, the third frame 65C is immovable relative to the photosensitive drum 61.

The third frame 65C has a passage port 655, two passage ports 656A and 656B, and a plurality of engagement holes 657A, 657B, 658A, 658B, 659A, and 659B.

The passage port 655 is positioned at the center portion of the third frame 65C in the first direction. The passage port 655 is in communication with the internal space of the developing housing 631. The passage port 655 allows toner fed from the toner cartridge 7 to pass through the passage port 655.

The passage port 656A is positioned apart from the passage port 655 in the first direction. The passage port 656A is positioned between the passage port 655 and the first frame 65A in the first direction. The passage port 656A is in communication with the internal space of the developing housing 631, as in the passage port 655. The passage port 656A allows toner fed from the developing housing 631 to pass through the passage port 656A.

The passage port 656B is positioned on the opposite side of the passage port 655 from the passage port 656A in the first direction. The passage port 656B is positioned apart from the passage port 655 in the first direction. The passage port 656B is positioned between the passage port 655 and the second frame 65B in the first direction. The passage port 656B is in communication with the internal space of the developing housing 631, as in the passage ports 655 and 656A. The passage port 656B allows toner fed from the developing housing 631 to pass through the passage port 656B.

The engagement hole 657A is positioned between the passage port 655 and the first frame 65A in the first direction.

The engagement hole 657B is positioned between the passage port 655 and the second frame 65B in the first direction. The engagement hole 657B is positioned apart from the engagement hole 657A in the first direction. The passage port 655 is positioned between the engagement hole 657A and the engagement hole 657B in the first direction.

The engagement hole 658A is positioned between the passage port 656A and the first frame 65A in the first direction.

The engagement hole 658B is positioned between the passage port 656A and the engagement hole 657A in the first direction. The engagement hole 658B is positioned apart from the engagement hole 658A in the first direction. The passage port 656A is positioned between the engagement hole 658A and the engagement hole 658B in the first direction.

The engagement hole 659A is positioned between the passage port 656B and the engagement hole 657B in the first direction.

The engagement hole 659B is positioned between the passage port 656B and the second frame 65B in the first direction. The engagement hole 659B is positioned apart from the engagement hole 659A in the first direction. The passage port 656B is positioned between the engagement hole 659A and the engagement hole 659B in the first direction.

2.4 Developing Shutter 66

Figure 7:
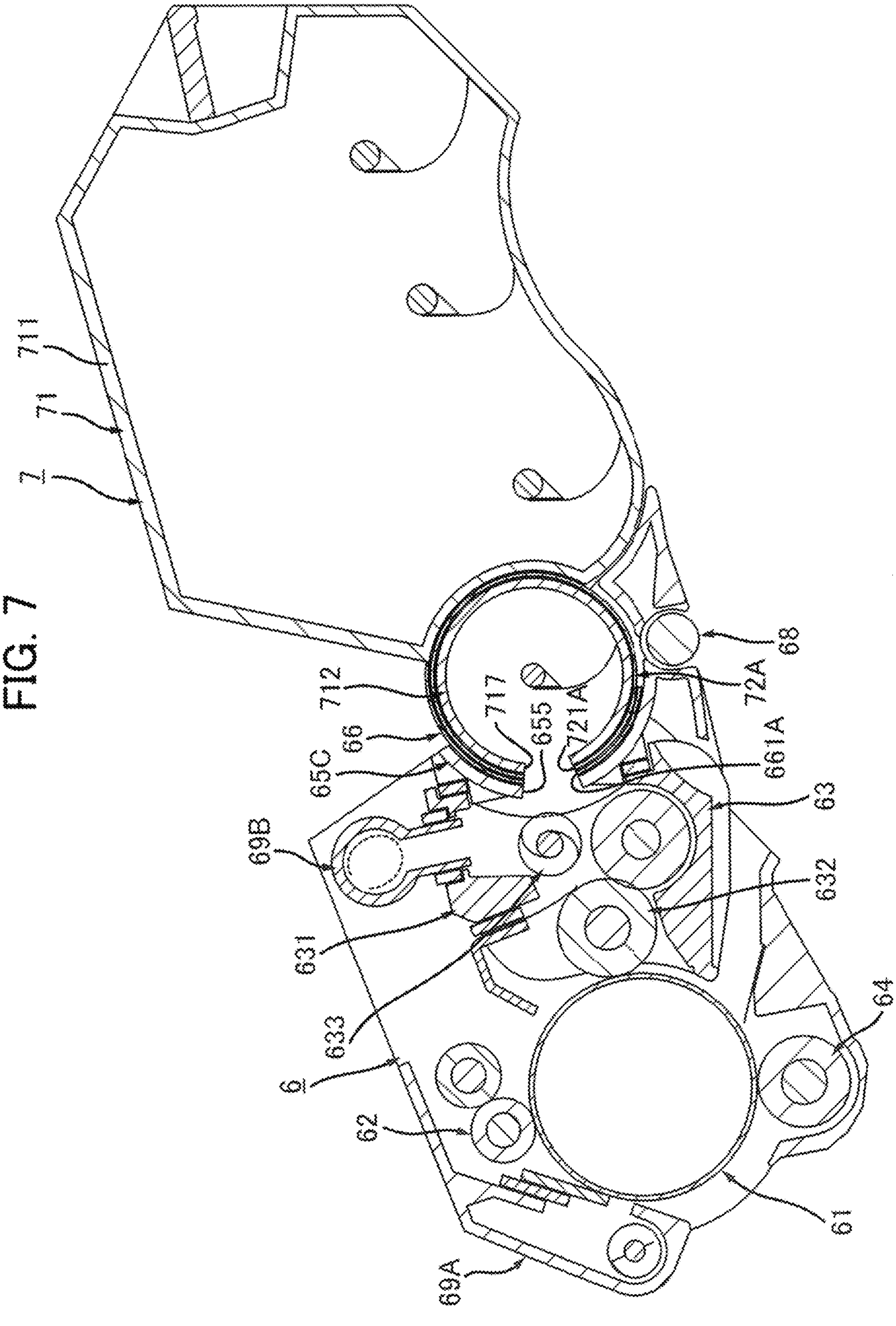
FIG. 7 is a view illustrating a state where the drum cartridge illustrated in FIG. 6 is coupled to the toner cartridge, the toner cartridge is located at a first pivot position, a developing shutter is located at a developing opening position, and a toner shutter is located at a toner first opening position.

As illustrated in FIG. 3, the developing shutter 66 is positioned on the opposite side of the third frame 65C from the developing housing 631. The developing shutter 66 is configured to open and close the passage ports 655, 656A, and 656B. For more details, as illustrated in FIGS. 6 and 7, the developing shutter 66 is movable between a developing closing position (see FIG. 6) and a developing opening position (see FIG. 7). The developing shutter 66 closes the passage ports 655, 656A, and 656B in a state where the developing shutter 66 is located at the developing closing position. The developing shutter 66 opens the passage ports 655, 656A, and 656B in a state where the developing shutter 66 is located at the developing opening position.

As illustrated in FIG. 3, the developing shutter 66 extends in the first direction. The developing shutter 66 has three shutter openings 661A, 661B, and 661C, two engagement holes 662A and 662B, and a plurality of slits 663A, 663B, 664A, 664B, 665A, and 665B.

2.4.1 Shutter Openings 661A, 661B, 661C

The shutter opening 661A is positioned at the center portion of the developing shutter 66 in the first direction.

As illustrated in FIG. 6, in a state where the developing shutter 66 is located at the developing closing position, the shutter opening 661A is positioned apart from the passage port 655. That is, in this state, the shutter opening 661A is not in communication with the passage port 655.

As illustrated in FIG. 7, the shutter opening 661A is in communication with the passage port 655 in a state where the developing shutter 66 is located at the developing opening position.

As illustrated in FIG. 3, the shutter opening 661B is positioned apart from the shutter opening 661A in the first direction. The shutter opening 661B is positioned between the shutter opening 661A and the first frame 65A in the first direction.

The shutter opening 661B is positioned apart from the passage port 656A in a state where the developing shutter 66 is located at the developing closing position. In this state, the shutter opening 661B is not in communication with the passage port 656A. The shutter opening 661B is in communication with the passage port 656A in a state where the developing shutter 66 is located at the developing opening position (see FIG. 7).

The shutter opening 661C is positioned on the opposite side of the shutter opening 661A from the shutter opening 661B in the first direction. The shutter opening 661C is positioned apart from the shutter opening 661A in the first direction. The shutter opening 661C is positioned between the shutter opening 661A and the second frame 65B in the first direction.

The shutter opening 661C is positioned apart from the passage port 656B in a state where the developing shutter 66 is located at the developing closing position. In this state, the shutter opening 661C is not in communication with the passage port 656B. The shutter opening 661C is in communication with the passage port 656B in a state where the developing shutter 66 is located at the developing opening position (see FIG. 7).

2.4.2 Engagement Holes 662A, 662B

As illustrated in FIG. 3, the engagement hole 662A is positioned at one end portion of the developing shutter 66 in the first direction. The engagement hole 662A is positioned between the first frame 65A and the shutter opening 661B in the first direction.

The engagement hole 662B is positioned at the other end portion of the developing shutter 66 in the first direction. The engagement hole 662B is positioned between the second frame 65B and the shutter opening 661C in the first direction.

2.4.3 Slits 663A, 663B, 664A, 664B, 665A, 665B

As illustrated in FIG. 3, the slit 663A is positioned between the shutter opening 661A and the first frame 65A in the first direction. The slit 663A extends in the moving direction of the developing shutter 66. The slit 663A is in communication with the engagement hole 657A of the third frame 65C.

The slit 663B is positioned between the shutter opening 661A and the second frame 65B in the first direction. The slit 663B is positioned apart from the slit 663A in the first direction. The shutter opening 661A is positioned between the slit 663A and the slit 663B in the first direction. The slit 663B extends in the moving direction of the developing shutter 66. The slit 663B is in communication with the engagement hole 657B of the third frame 65C.

The slit 664A is positioned between the shutter opening 661B and the engagement hole 662A in the first direction. The slit 664A extends in the moving direction of the developing shutter 66. The slit 664A is in communication with the engagement hole 658A of the third frame 65C.

The slit 664B is positioned between the shutter opening 661B and the slit 663A in the first direction. The slit 664B is positioned apart from the slit 664A in the first direction. The shutter opening 661B is positioned between the slit 664A and the slit 664B in the first direction. The slit 664B extends in the moving direction of the developing shutter 66. The slit 664B is in communication with the engagement hole 658B of the third frame 65C.

The slit 665A is positioned between the shutter opening 661C and the slit 663B in the first direction. The slit 665A extends in the moving direction of the developing shutter 66. The slit 665A is in communication with the engagement hole 659A of the third frame 65C.

The slit 665B is positioned between the shutter opening 661C and the engagement hole 662B in the first direction. The slit 665B is positioned apart from the slit 665A in the first direction. The shutter opening 661C is positioned between the slit 665A and the slit 665B in the first direction. The slit 665B extends in the moving direction of the developing shutter 66. The slit 665B is in communication with the engagement hole 659B of the third frame 65C.

2.5 Details of Developing Unit 63

Figure 8:
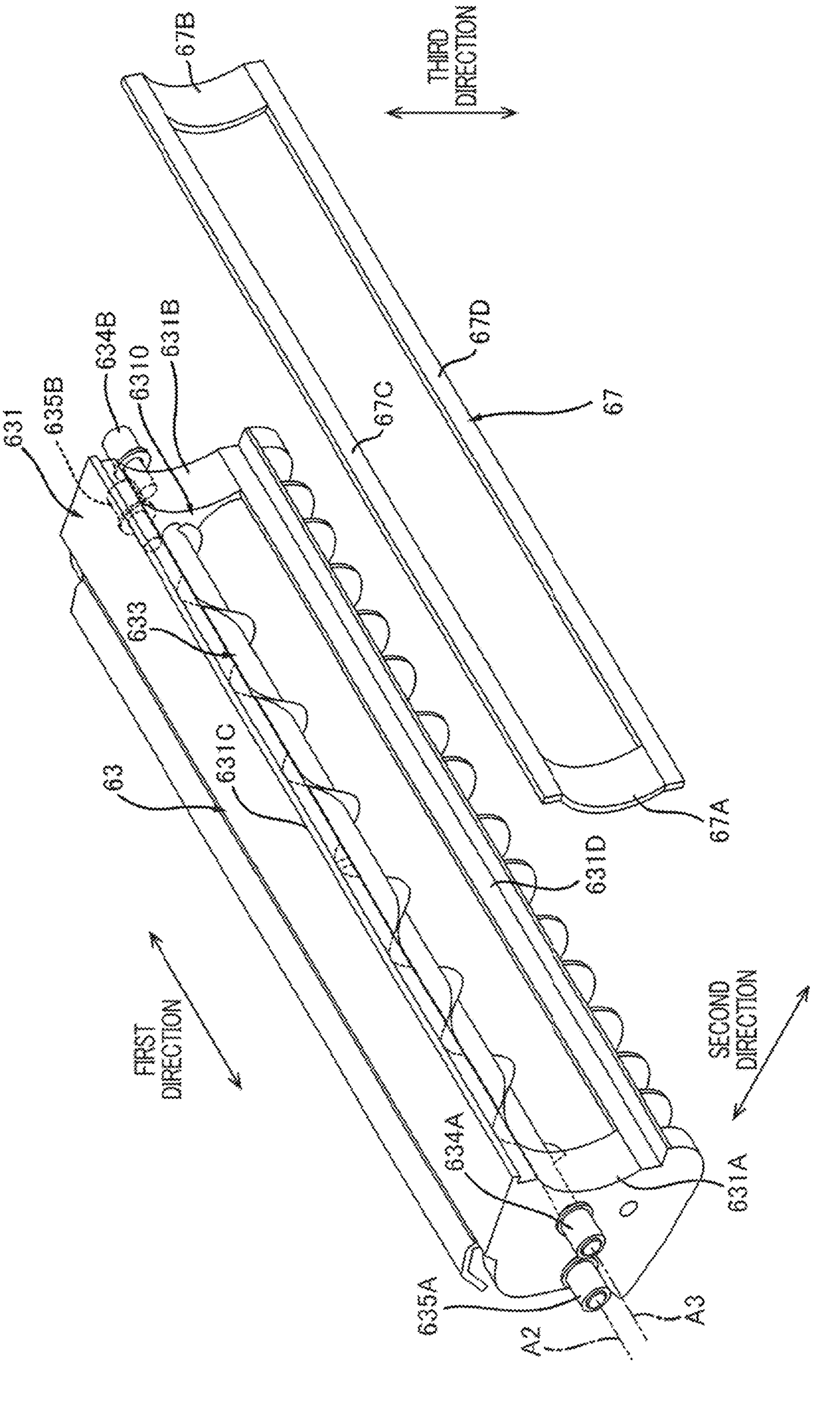
FIG. 8 is a perspective view of a developing unit and seal member illustrated in FIG. 6.

As illustrated in FIG. 8, the developing unit 63 includes a conveying member 633 and a plurality of protrusions 634A, 635A, 634B, and 635B in addition to the above-described developing housing 631 and developing roller 632.

2.5.1 Details of Developing Housing 631

As illustrated in FIG. 6, the developing housing 631 is positioned between the photosensitive drum 61 and the third frame 65C in the second direction. As illustrated in FIG. 4, the developing housing 631 is positioned between the first frame 65A and the second frame 65B in the first direction. The developing housing 631 extends in the first direction. The developing housing 631 is configured to store therein toner that has passed through the passage port 655.

As illustrated in FIG. 8, the developing housing 631 has a first wall 631A, a second wall 631B, a third wall 631C, and a fourth wall 631D. The developing housing 631 has an opening 6310 and an opening 6311.

The first wall 631A is positioned at one end portion of the developing housing 631 in the first direction. The first wall 631A faces the first frame 65A (see FIG. 4) in the first direction. The first wall 631A extends in both the second direction and the third direction. The first wall 631A supports one end portion of the developing roller 632 (see FIG. 4) in the first direction.

For more details, as illustrated in FIG. 6, the developing roller 632 includes a developing roller body 632A and a developing roller shaft 632B.

The developing roller body 632A extends in the first direction. The developing roller body 632A has a columnar shape. The developing roller body 632A is positioned between the first wall 631A and the second wall 631B in the first direction. The developing roller body 632A is rotatable together with the developing roller shaft 632B.

The developing roller shaft 632B extends along the axis A2 in the first direction. The developing roller shaft 632B penetrates the developing roller body 632A. One end portion of the developing roller shaft 632B in the first direction protrudes from one end portion of the developing roller body 632A in the first direction. The other end portion of the developing roller shaft 632B in the first direction protrudes from the other end portion of the developing roller body 632A in the first direction. The first wall 631A supports the one end portion of the developing roller shaft 632B (see FIG. 4) in the first direction.

As illustrated in FIG. 8, the second wall 631B is positioned at the other end portion of the developing housing 631 in the first direction. The second wall 631B is positioned apart from the first wall 631A in the first direction. The second wall 631B is positioned between the first wall 631A and the second frame 65B (see FIG. 4) in the first direction. The second wall 631B faces the second frame 65B in the first direction. The second wall 631B extends in both the second direction and the third direction. The second wall 631B supports the other end portion of the developing roller 632 (see FIG. 4) in the first direction. For more details, the second wall 631B supports the other end portion of the developing roller shaft 632B in the first direction.

The first wall 631A supports the one end portion of the developing roller 632 in the first direction and the second wall 631B supports the other end portion of the developing roller 632 in the first direction, whereby the developing roller 632 is supported by the developing housing 631.

The third wall 631C is positioned at one end portion of the developing housing 631 in the third direction. The third wall 631C is positioned between the first wall 631A and the second wall 631B in the first direction. The third wall 631C extends in both the first direction and the second direction. One end portion of the third wall 631C in the first direction is connected to the first wall 631A, and the other end portion of the third wall 631C in the first direction is connected to the second wall 631B.

The fourth wall 631D is positioned at the other end portion of the developing housing 631 in the third direction. The fourth wall 631D is positioned apart from the third wall 631C in the third direction. The fourth wall 631D is positioned between the first wall 631A and the second wall 631B in the first direction. The fourth wall 631D extends in both the first direction and the second direction. One end portion of the fourth wall 631D in the first direction is connected to the first wall 631A, and the other end portion of the fourth wall 631D in the first direction is connected to the second wall 631B.

The opening 6310 is positioned at the other end portion of the developing housing 631 in the second direction. The opening 6310 is positioned apart from the developing roller 632 (see FIG. 6) in the second direction. The opening 6310 extends from the first wall 631A to the second wall 631B in the first direction and extends from the third wall 631C to the fourth wall 631D in the third direction. The passage ports 655, 656A, and 656B (see FIG. 3) are positioned in the opening 6310 in both the first direction and the third direction. With this configuration, the passage ports 655, 656A, and 656B are in communication with the internal space of the developing housing 631.

As illustrated in FIG. 3, the opening 6311 is positioned at the center portion of the third wall 631C in the first direction. The opening 6311 is an opening for receiving collected toner in the developing housing 631. The collected toner will be described later. The opening 6311 is in communication with the internal space of the developing housing 631. Note that an illustration of the opening 6311 is omitted from FIG. 8.

2.5.2 Conveying Member 633

As illustrated in FIG. 8, the conveying member 633 is positioned in the developing housing 631. The conveying member 633 conveys toner stored in the developing housing 631 in the first direction. For more details, the conveying member 633 is configured to convey toner stored in the developing housing 631 from the passage port 655 toward the passage port 656A (see FIG. 4). Further, the conveying member 633 is configured to convey toner stored in the developing housing 631 from the passage port 655 toward the passage port 656B (see FIG. 4). The conveying member 633 extends in the first direction. One end portion of the conveying member 633 in the first direction is supported by the first wall 631A, and the other end portion of the conveying member 633 in the first direction is supported by the second wall 631B. The conveying member 633 is rotatable about an axis A3. The axis A3 extends in the first direction. In the present embodiment, the conveying member 633 is an auger screw.

2.5.3 Protrusions 634A, 635A, 634B, 635B

As illustrated in FIG. 5, the protrusion 634A is positioned apart from the photosensitive drum 61 in the direction connecting the axis A1 and the axis A2. The protrusion 634A is fitted in the through hole 653A of the first frame 65A. As illustrated in FIG. 8, the protrusion 634A is positioned on the opposite side of the first wall 631A from the second wall 631B in the first direction. The protrusion 634A extends in the first direction. The protrusion 634A has a columnar shape. In the present embodiment, the protrusion 634A is the one end portion of the conveying member 633. The protrusion 634A may extend from one end surface of the developing housing 631 in the first direction. The protrusion 634A may be mounted on the one end surface of the developing housing 631 in the first direction.

As illustrated in FIG. 5, the protrusion 635A is positioned between the photosensitive drum 61 and the protrusion 634A in the direction connecting the axis A1 and the axis A2. The protrusion 635A is fitted in the through hole 654A of the first frame 65A. As illustrated in FIG. 8, the protrusion 635A is positioned on the opposite side of the first wall 631A from the second wall 631B in the first direction. The protrusion 635A extends in the first direction. The protrusion 635A has a columnar shape. In the present embodiment, the protrusion 635A is the one end portion of the developing roller shaft 632B. The protrusion 635A may extend from the one end surface of the developing housing 631 in the first direction. The protrusion 635A may be mounted on the one end surface of the developing housing 631 in the first direction.

As illustrated in FIG. 4, the protrusion 634B is positioned apart from the photosensitive drum 61 in the direction connecting the axis A1 and the axis A2. The protrusion 634B is fitted in the through hole 653B of the second frame 65B. As illustrated in FIG. 8, the protrusion 634B is positioned on the opposite side of the second wall 631B from the first wall 631A in the first direction. The protrusion 634B extends in the first direction. The protrusion 634B has a columnar shape. In the present embodiment, the protrusion 634B is the other end portion of the conveying member 633. The protrusion 634B may extend from the other end surface of the developing housing 631 in the first direction. The protrusion 634B may be mounted on the other end surface of the developing housing 631 in the first direction.

As illustrated in FIG. 4, the protrusion 635B is positioned between the photosensitive drum 61 and the protrusion 634B in the direction connecting the axis A1 and the axis A2. The protrusion 635B is fitted in the through hole 654B of the second frame 65B. As illustrated in FIG. 8, the protrusion 635B is positioned on the opposite side of the second wall 631B from the first wall 631A in the first direction. The protrusion 635B extends in the first direction. The protrusion 635B has a columnar shape. In the present embodiment, the protrusion 635B is the other end portion of the developing roller shaft 632B. The protrusion 635B may extend from the other end surface of the developing housing 631 in the first direction. The protrusion 635B may be mounted on the other end surface of the developing housing 631 in the first direction.

As illustrated in FIG. 4, the protrusion 634A is fitted in the through hole 653A, the protrusion 635A is fitted in the through hole 654A, the protrusion 634B is fitted in the through hole 653B, and the protrusion 635B is fitted in the through hole 654B. With this configuration, the developing unit 63 is movable relative to the photosensitive drum 61 in the direction connecting the axis A1 and the axis A2. In other words, the developing housing 631 is movable relative to the photosensitive drum 61 in the direction connecting the axis A1 and the axis A2.

2.6 Seal Member 67

As illustrated in FIG. 6, the seal member 67 seals a space between the developing housing 631 and the third frame 65C. The seal member 67 is positioned around the opening 6310 of the developing housing 631.

For more details, the seal member 67 has a frame shape. The seal member 67 has a first seal part 67A, a second seal part 67B, a third seal part 67C, and a fourth seal part 67D.

The first seal part 67A is positioned at one end portion of the seal member 67 in the first direction. The first seal part 67A extends in the third direction. The first seal part 67A is positioned between the first wall 631A and the third frame 65C (see FIG. 6). More specifically, the first seal part 67A is positioned between the third frame 65C and the surface of the first wall 631A that faces away from the photosensitive drum 61 in the second direction (i.e., the surface of the first wall 631A that is positioned at the other end portion of the developing housing 631 in the second direction). The first seal part 67A seals a space between the first wall 631A and the third frame 65C.

The second seal part 67B is positioned at the other end portion of the seal member 67 in the first direction. The second seal part 67B is positioned apart from the first seal part 67A in the first direction. The second seal part 67B extends in the third direction. The second seal part 67B is positioned between the second wall 631B and the third frame 65C. More specifically, the second seal part 67B is positioned between the third frame 65C and the surface of the second wall 631B that faces away from the photosensitive drum 61 in the second direction (i.e., the surface of the second wall 631B that is positioned at the other end portion of the developing housing 631 in the second direction). The second seal part 67B seals a space between the second wall 631B and the third frame 65C.

The third seal part 67C is positioned at one end portion of the seal member 67 in the third direction. The third seal part 67C extends in the first direction. One end portion of the third seal part 67C in the first direction is connected to the first seal part 67A, and the other end portion of the third seal part 67C in the first direction is connected to the second seal part 67B. The third seal part 67C is positioned between the third wall 631C and the third frame 65C. More specifically, the third seal part 67C is positioned between the third frame 65C and the surface of the third wall 631C that faces away from the photosensitive drum 61 in the second direction (i.e., the surface of the third wall 631C that is positioned at the other end portion of the developing housing 631 in the second direction). The third seal part 67C seals a space between the third wall 631C and the third frame 65C.

The fourth seal part 67D is positioned at the other end portion of the seal member 67 in the third direction. The fourth seal part 67D is positioned apart from the third seal part 67C in the third direction. The fourth seal part 67D extends in the first direction. One end portion of the fourth seal part 67D in the first direction is connected to the first seal part 67A, and the other end portion of the fourth seal part 67D in the first direction is connected to the second seal part 67B. The fourth seal part 67D is positioned between the fourth wall 631D and the third frame 65C. More specifically, the fourth seal part 67D is positioned between the third frame 65C and the surface of the fourth wall 631D that faces away from the photosensitive drum 61 in the second direction (i.e., the surface of the fourth wall 631D that is positioned at the other end portion of the developing housing 631 in the second direction). The fourth seal part 67D seals a space between the fourth wall 631D and the third frame 65C.

The passage ports 655, 656A, and 656B (see FIG. 3) are positioned between the first seal part 67A and the second seal part 67B in the first direction. Further, the passage ports 655, 656A, and 656B are positioned between the third seal part 67C and the fourth seal part 67D in the third direction. That is, the seal member 67 is positioned around the passage ports 655, 656A, and 656B but is positioned apart from the passage ports 655, 656A, and 656B.

The seal member 67 is elastically deformable in accordance with movement of the developing housing 631 relative to the photosensitive drum 61. With this configuration, toner can be suppressed from leaking from between the developing housing 631 and the third frame 65C when the developing housing 631 moves relative to the photosensitive drum 61. The seal member 67 is made of sponge, for example.

2.7 Opposing Roller 68

As illustrated in FIG. 6, the drum cartridge 6 has one end portion and the other end portion in the second direction. The drum cleaner 69A is positioned at the one end portion of the drum cartridge 6 in the second direction. The opposing roller 68 is positioned at the other end portion of the drum cartridge 6 in the second direction. The opposing roller 68 is positioned apart from the photosensitive drum 61 in the second direction. The opposing roller 68 is positioned on the other side of the third frame 65C in the third direction. More specifically, the third frame 65C has one end portion and the other end portion in the third direction. The other end portion of the third frame 65C in the third direction is farther from the third seal part 67C than the one end portion of the third frame 65C in the third direction is from the third seal part 67C. In the third direction, the opposing roller 68 is positioned on the opposite side of the other end portion of the third frame 65C in the third direction from the one end portion of the third frame 65C in the third direction.

As illustrated in FIG. 1, the opposing roller 68 is configured to contact the conveying roller 5 in a state where the drum cartridge 6 is located at the drum first position. With this configuration, the conveying roller 5 can convey the sheet S stored in the sheet storage section 4 toward the photosensitive drum 61 in a state where the drum cartridge 6 is located at the drum first position.

2.8 Drum Cleaner 69A

As illustrated in FIG. 6, as described above, the drum cleaner 69A is positioned at the one end portion of the drum cartridge 6 in the second direction. The drum cleaner 69A includes a collected toner storage section 691 and a drum cleaning member 692.

As illustrated in FIG. 4, the collected toner storage section 691 is positioned between the first frame 65A and the second frame 65B in the first direction. The collected toner storage section 691 extends in the first direction. One end portion of the collected toner storage section 691 in the first direction is connected to the first frame 65A, and the other end portion of the collected toner storage section 691 in the first direction is connected to the second frame 65B. As illustrated in FIG. 6, the collected toner storage section 691 has an opening 691A. The collected toner storage section 691 stores therein collected toner.

The drum cleaning member 692 is attached to the collected toner storage section 691. The drum cleaning member 692 extends in the first direction. The drum cleaning member 692 has a plate shape. The drum cleaning member 692 is configured to clean the peripheral surface of the photosensitive drum 61. For more details, the edge of the drum cleaning member 692 contacts the peripheral surface of the photosensitive drum 61. When the photosensitive drum 61 rotates, toner on the peripheral surface of the photosensitive drum 61 contacts the edge of the drum cleaning member 692 to be removed from the peripheral surface of the photosensitive drum 61. The toner that has been removed from the peripheral surface of the photosensitive drum 61 by the drum cleaning member 692 is collected toner. The collected toner passes through the opening 691A to be stored in the collected toner storage section 691.

2.9 Collected Toner Pipe 69B

As illustrated in FIG. 4, one end portion of the collected toner pipe 69B is connected to the collected toner storage section 691, and the other end portion of the collected toner pipe 69B is connected to the center portion of the developing housing 631 in the first direction. The collected toner stored in the collected toner storage section 691 passes through the collected toner pipe 69B to be collected in the developing housing 631.

For more details, as illustrated in FIGS. 3 and 6, the collected toner pipe 69B includes a discharge part 693. The collected toner stored in the collected toner pipe 69B can be discharged through the discharge part 693. The discharge part 693 is positioned at the other end portion of the collected toner pipe 69B. The discharge part 693 extends in the third direction from the other end portion of the collected toner pipe 69B toward the opening 6311 of the developing housing 631. The discharge part 693 has a cylindrical shape. The discharge part 693 is inserted in the opening 6311 of the developing housing 631. With this structure, the other end portion of the collected toner pipe 69B is connected to the center portion of the developing housing 631 in the first direction. The collected toner in the collected toner pipe 69B passes through the discharge part 693 to be collected in the developing housing 631.

2.10 Collected Toner Conveying Member 69C

As illustrated in FIG. 4, the collected toner conveying member 69C is positioned inside the collected toner storage section 691 and collected toner pipe 69B. The collected toner conveying member 69C is configured to convey the collected toner stored in the collected toner storage section 691 toward the developing housing 631. The collected toner conveying member 69C is a shaftless screw.

2.11 Seal Member 69D

As illustrated in FIGS. 3 and 6, the seal member 69D seals a space between the discharge part 693 and the developing housing 631. The seal member 69D is positioned between the outer peripheral surface of the discharge part 693 and the inner peripheral surface of the opening 6311 (i.e., the inner surface of the developing housing 631 which defines the opening 6311). The seal member 69D is elastically deformable in accordance with movement of the developing housing 631 relative to the photosensitive drum 61. With this configuration, toner can be suppressed from leaking from between the developing housing 631 and the discharge part 693 when the developing housing 631 moves relative to the photosensitive drum 61. The seal member 69D is made of sponge, for example.

2.12 Protrusions 601A, 601B, 602A, 602B, 603A, 603B

As illustrated in FIG. 3, the protrusion 601A is positioned on the opposite side of the first frame 65A from the second frame 65B in the first direction. The protrusion 601A extends along the axis A1 in the first direction. The protrusion 601A has a columnar shape. In the present embodiment, the protrusion 601A is one end portion of the shaft of the photosensitive drum 61. The protrusion 601A may extend from the outer surface S11 of the first frame 65A. The protrusion 601A may be mounted on the outer surface S11 of the first frame 65A.

As illustrated in FIG. 4, the protrusion 601B is positioned on the opposite side of the second frame 65B from the first frame 65A in the first direction. The protrusion 601B extends along the axis A1 in the first direction. The protrusion 601B has a columnar shape. In the present embodiment, the protrusion 601B is the other end portion of the shaft of the photosensitive drum 61. The protrusion 601B may extend from the outer surface S13 of the second frame 65B. The protrusion 601B may be mounted on the outer surface S13 of the second frame 65B.

The protrusion 602A is positioned apart from the protrusion 601A in the second direction. The protrusion 602A is positioned on the opposite side of the developing housing 631 from the protrusion 601A in the second direction. As illustrated in FIG. 3, the protrusion 602A is positioned on the opposite side of the first frame 65A from the second frame 65B in the first direction. The protrusion 602A extends in the first direction. The protrusion 602A has a columnar shape. The protrusion 602A extends from the outer surface S11 of the first frame 65A. The protrusion 602A may be mounted on the outer surface S11 of the first frame 65A.

As illustrated in FIG. 4, the protrusion 602B is positioned apart from the protrusion 601B in the second direction. The protrusion 602B is positioned on the opposite side of the developing housing 631 from the protrusion 601B in the second direction. The protrusion 602B is positioned on the opposite side of the second frame 65B from the first frame 65A in the first direction. The protrusion 602B extends in the first direction. The protrusion 602B has a columnar shape. The protrusion 602B extends from the outer surface S13 of the second frame 65B. The protrusion 602B may be mounted on the outer surface S13 of the second frame 65B.

As illustrated in FIG. 3, the protrusion 603A is positioned apart from the protrusion 602A in the third direction. The protrusion 603A is positioned on the other side of the protrusion 602A in the third direction. In other words, in the third direction, the protrusion 603A is positioned on the opposite side of the protrusion 602A from the one end portion of the third frame 65C in the third direction. The protrusion 603A is positioned apart from the protrusion 601A in the second direction. The protrusion 603A is positioned on the opposite side of the first frame 65A from the second frame 65B in the first direction. The protrusion 603A extends in the first direction. The protrusion 603A has a columnar shape. In the present embodiment, the protrusion 603A is one end portion of the opposing roller 68. The protrusion 603A may extend from the outer surface S11 of the first frame 65A. The protrusion 603A may be mounted on the outer surface S11 of the first frame 65A.

As illustrated in FIG. 4, the protrusion 603B is positioned apart from the protrusion 601B in the second direction. The protrusion 603B is positioned on the opposite side of the second frame 65B from the first frame 65A in the first direction. The protrusion 603B is positioned apart from the protrusion 602B in the third direction. The protrusion 603B is positioned on the other side of the protrusion 602B in the third direction. In other words, in the third direction, the protrusion 603B is positioned on the opposite side of the protrusion 602B from the one end portion of the third frame 65C in the third direction. The protrusion 603B extends in the first direction. The protrusion 603B has a columnar shape. In the present embodiment, the protrusion 603B is the other end portion of the opposing roller 68. The protrusion 603B may extend from the outer surface S13 of the second frame 65B. The protrusion 603B may be mounted on the outer surface S13 of the second frame 65B.

3. Details of Toner Cartridge 7

The following describes details of the toner cartridge 7 with reference to FIGS. 1, 3, 6, 7, and 9 to 18. Hereinafter, in the description of the toner cartridge 7, the "first direction", "second direction", and "third direction" are defined in a state where the toner cartridge 7 is coupled to the drum cartridge 6 and the drum cartridge 6 and toner cartridge 7 are located at the drum first position and the toner first position, respectively.

Figure 9:
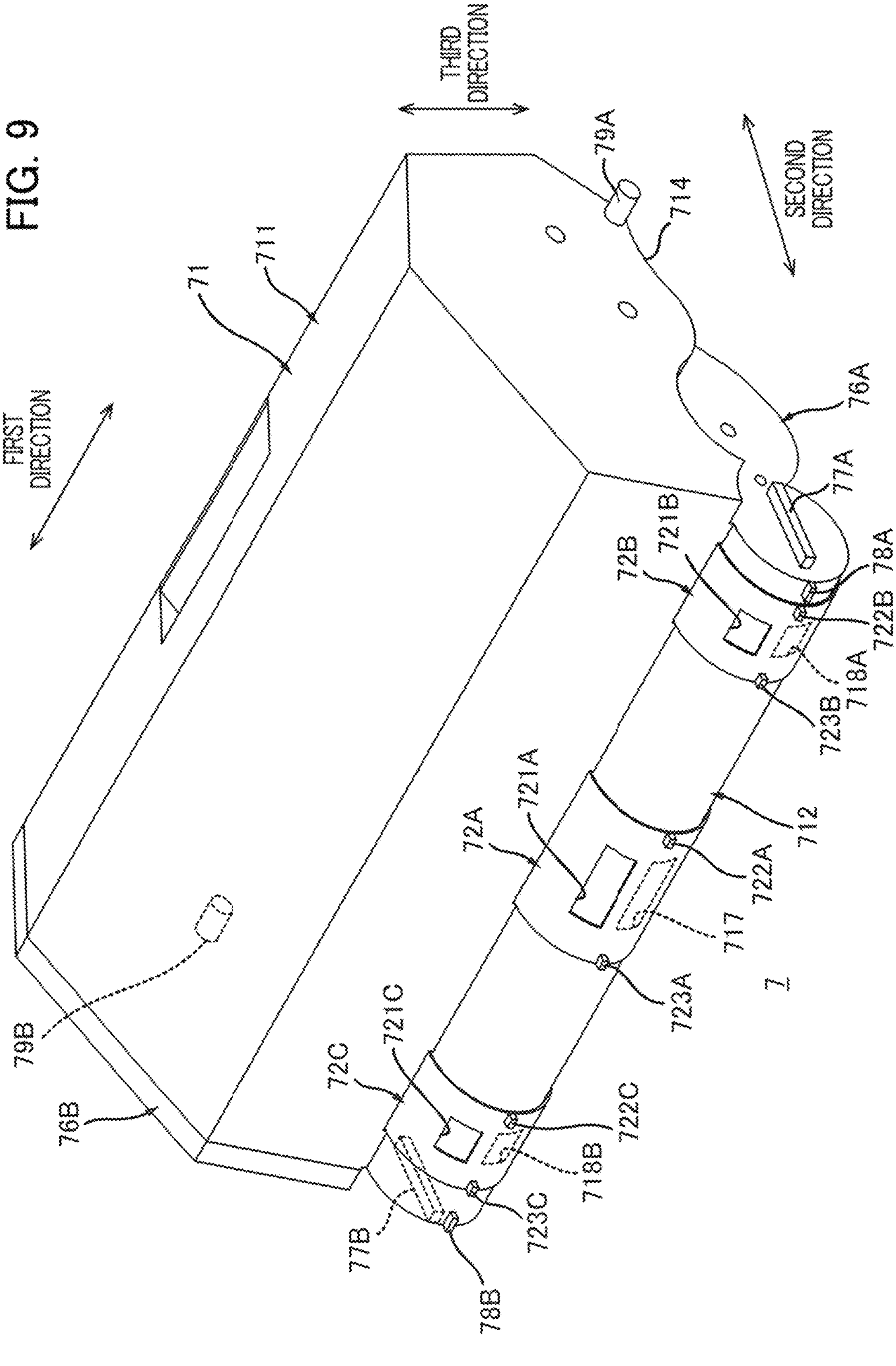
FIG. 9 is a perspective view of the toner cartridge illustrated in FIG. 1.

As illustrated in FIG. 9, the toner cartridge 7 includes a toner housing 71, three toner shutters 72A, 72B, and 72C, a plurality of agitators 73A, 73B, 73C, and 73D (see FIG. 10), a coupling 74 (see FIG. 14), a plurality of gears 75A, 75B, 75C, 75D, 75E, 75F, and 75G (see FIGS. 14 and 15), two gear covers 76A and 76B, two ribs 77A and 77B, two engagement parts 78A and 78B, and two protrusions 79A and 79B.

3.1 Toner Housing 71

The toner housing 71 has a first storage section 711, a second storage section 712, a partition wall 713 (see FIG. 10), and a sheet guide 714. In other words, the toner cartridge 7 includes the first storage section 711, the second storage section 712, the partition wall 713, and the sheet guide 714.

3.1.1 First Storage Section 711

The first storage section 711 is configured to store therein toner. The first storage section 711 extends in the first direction. The first storage section 711 has a box shape.

As illustrated in FIG. 1, in a state where the toner cartridge 7 is coupled to the drum cartridge 6 and the drum cartridge 6 and the toner cartridge 7 are located at the drum first position and the toner first position, respectively, at least a portion of the first storage section 711 is positioned between the drum cartridge 6 and the cover 3.

Thus, irrespective of the structure and size of the drum cartridge 6, the capacity of the toner cartridge 7 can be increased by utilizing the space between the drum cartridge 6 and the cover 3.

3.1.2 Second Storage Section 712

As illustrated in FIG. 9, the second storage section 712 is positioned at one end portion of the toner cartridge 7 in the second direction. The second storage section 712 extends in the first direction. The second storage section 712 has a cylindrical shape.

Figure 11:
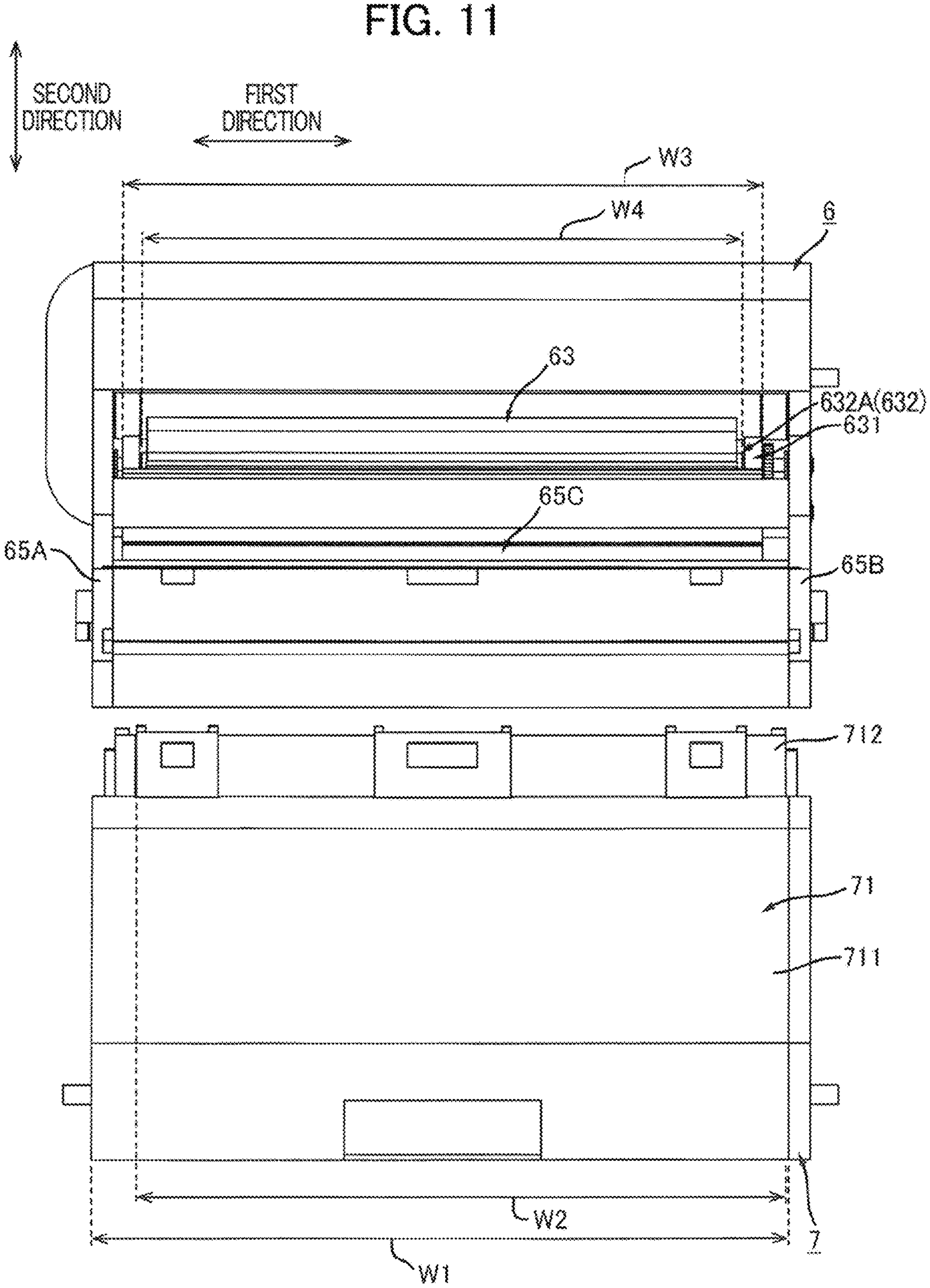
FIG. 11 is a view for explaining the size of the toner cartridge relative to the size of the drum cartridge.

As illustrated in FIG. 11, the second storage section 712 has a length W2 in the first direction. The developing housing 631 has a length W3 in the first direction. The developing roller body 632A has a length W4 in the first direction. The length W2 of the second storage section 712 in the first direction is larger than the length W3 of the developing housing 631 in the first direction. Further, the length W2 of the second storage section 712 in the first direction is larger than the length W4 of the developing roller body 632A in the first direction. Thus, the amount of toner that can be stored in the second storage section 712 is larger than the amount of toner that can be stored in the developing housing 631. Accordingly, a sufficient amount of toner to be supplied to the developing housing 631 can be stored in the second storage section 712.

The first storage section has a length W1 in the first direction. The length W1 of the first storage section 711 in the first direction is larger than the length W2 of the second storage section 712 in the first direction. Thus, the amount of toner that can be stored in the first storage section 711 is larger than the amount of toner that can be stored in the second storage section 712. Accordingly, the capacity of the toner cartridge 7 can be increased by an increase in the size of the first storage section 711 in the first direction.

As illustrated in FIG. 1, in a state where the toner cartridge 7 is coupled to the drum cartridge 6 and the drum cartridge 6 and the toner cartridge 7 are located at the drum first position and the toner first position, respectively, the second storage section 712 is positioned between the third frame 65C of the drum cartridge 6 and the first storage section 711. Further, in this state, the second storage section 712 is positioned between the developing housing 631 of the drum cartridge 6 and the first storage section 711.

Figure 10:
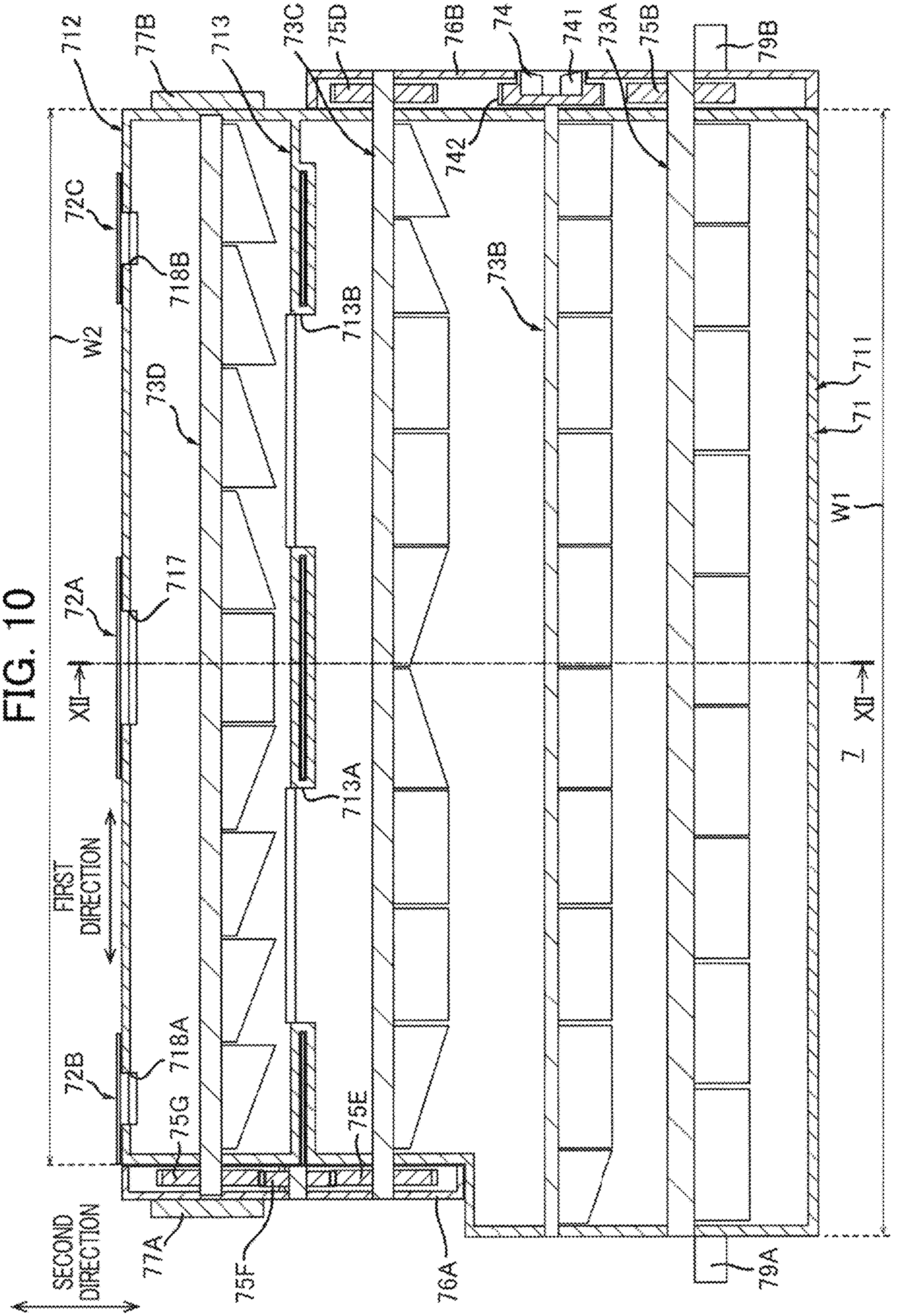
FIG. 10 is a cross-sectional view of the toner cartridge illustrated in FIG. 9 taken along line X-X of FIG. 12.

As illustrated in FIG. 10, the second storage section 712 is in communication with the first storage section 711. The second storage section 712 is configured to store therein toner fed from the first storage section 711. For more details, the second storage section 712 has a discharge port 717 and two receiving ports 718A and 718B.

The discharge port 717 is positioned at the center portion of the second storage section 712 in the first direction. The discharge port 717 is in communication with the internal space of the second storage section 712. This structure allows toner stored in the second storage section 712 to be discharged through the discharge port 717. That is, the discharge port 717 is a port for discharging toner from the second storage section 712.

The receiving port 718A is positioned at one end portion of the second storage section 712 in the first direction. The receiving port 718A is positioned apart from the discharge port 717 in the first direction. The receiving port 718A is in communication with the internal space of the second storage section 712. In a state where the toner cartridge 7 is coupled to the drum cartridge 6 and the drum cartridge 6 and the toner cartridge 7 are located at the drum first position and the toner first position, respectively, the receiving port 718A can receive return toner. The return toner refers to toner that is returned from the developing housing 631 to the toner cartridge 7.

The receiving port 718B is positioned at the other end portion of the second storage section 712 in the first direction. The receiving port 718B is positioned apart from the discharge port 717 in the first direction. The receiving port 718B is in communication with the internal space of the second storage section 712. In a state where the toner cartridge 7 is coupled to the drum cartridge 6 and the drum cartridge 6 and the toner cartridge 7 are located at the drum first position and the toner first position, respectively, the receiving port 718B can receive the return toner, as in the receiving port 718A.

3.1.2 Partition Wall 713

Figure 12:
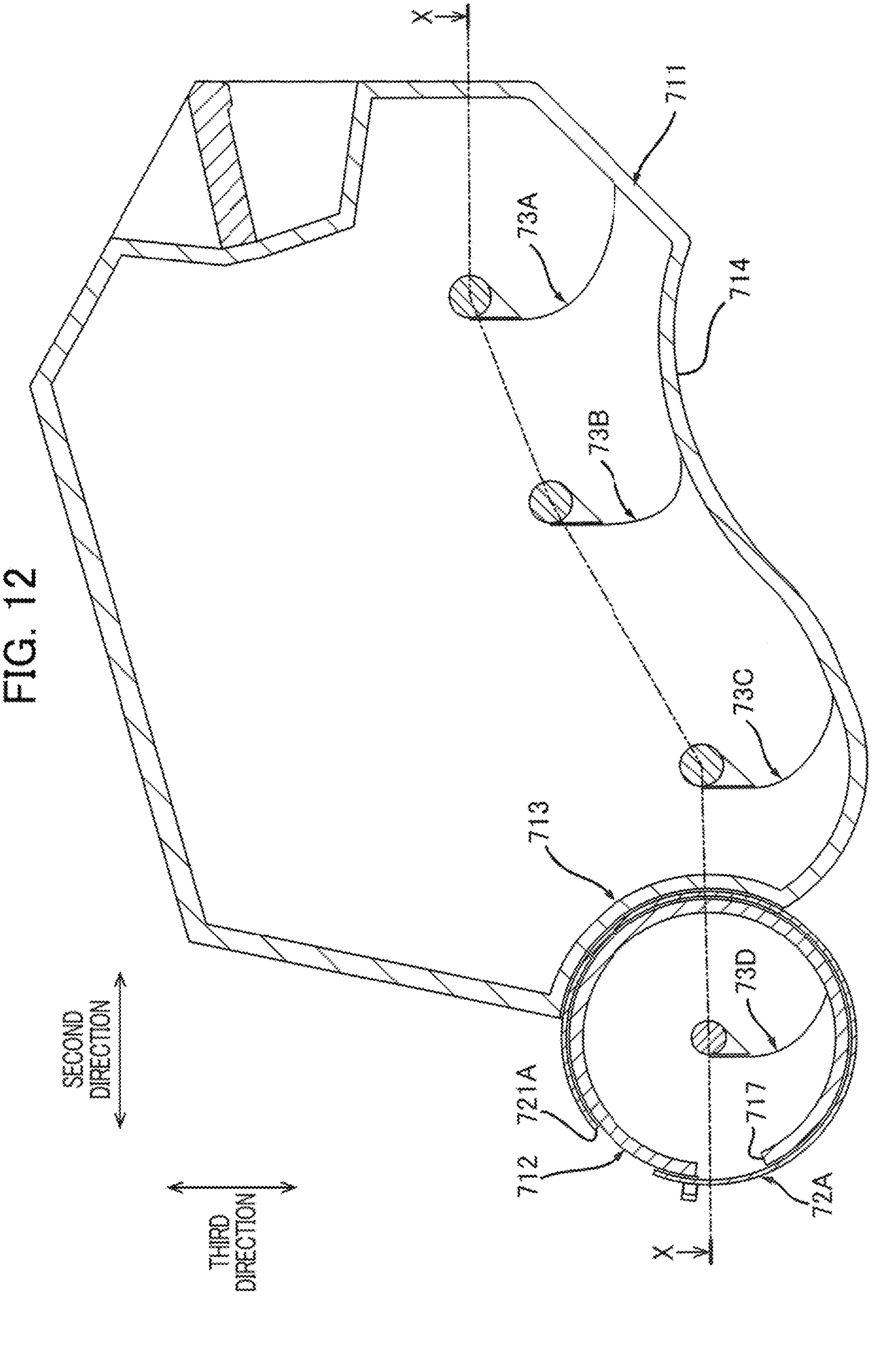
FIG. 12 is a cross-sectional view of the toner cartridge taken along line XII-XII of FIG. 10.

As illustrated in FIGS. 10 and 12, the partition wall 713 is positioned between the first storage section 711 and the second storage section 712. The partition wall 713 partitions the first storage section 711 from the second storage section 712. As illustrated in FIG. 10, the partition wall 713 has two openings 713A and 713B.

The opening 713A is positioned between the discharge port 717 and the receiving port 718A in the first direction. The internal space of the second storage section 712 is in communication with the internal space of the first storage section 711 through the opening 713A. Toner stored in the first storage section 711 passes through the opening 713A and enters the second storage section 712.

The opening 713B is positioned between the discharge port 717 and the receiving port 718B in the first direction. The opening 713B is positioned apart from the opening 713A in the first direction. The internal space of the second storage section 712 is in communication with the internal space of the first storage section 711 through the opening 713B. Toner stored in the first storage section 711 passes through the opening 713B and enters the second storage section 712.

3.1.3 Sheet Guide 714

As illustrated in FIG. 1, the first storage section 711 has one end portion and the other end portion in the third direction. In the state illustrated in FIG. 1, the other end portion of the first storage section 711 in the third direction is positioned closer to the sheet tray 4 than the one end portion of the first storage section 711 in the third direction is to the sheet storage section 4. As illustrated in FIG. 12, the sheet guide 714 is positioned at the other end portion of the first storage section 711 in the third direction. That is, the toner cartridge 7 includes the sheet guide 714.

As illustrated in FIG. 1, the sheet guide 714 is configured to guide the sheet S being conveyed toward the photosensitive drum 61 in a state where the toner cartridge 7 is coupled to the drum cartridge 6 and the drum cartridge 6 and the toner cartridge 7 are located at the drum first position and the toner first position, respectively.

That is, the image forming apparatus 1 does not have a sheet guide other than the sheet guide 714 on the other side of the toner cartridge 7 in the third direction. In other words, the image forming apparatus 1 does not have a sheet guide other than the sheet guide 714 in an area on the side of the toner cartridge 7 in the third direction where the sheet storage section 4 is located.

Thus, the size of the toner cartridge 7 in the third direction can be increased compared to a configuration in which a sheet guide other than the sheet guide 714 is provided on the other side of the toner cartridge 7 in the third direction (i.e., a configuration in which a sheet guide other than the sheet guide 714 is provided in an area on the side of the toner cartridge 7 in the third direction where the sheet storage section 4 is located).

3.2 Toner Shutters 72A, 72B, 72C

Figure 13:
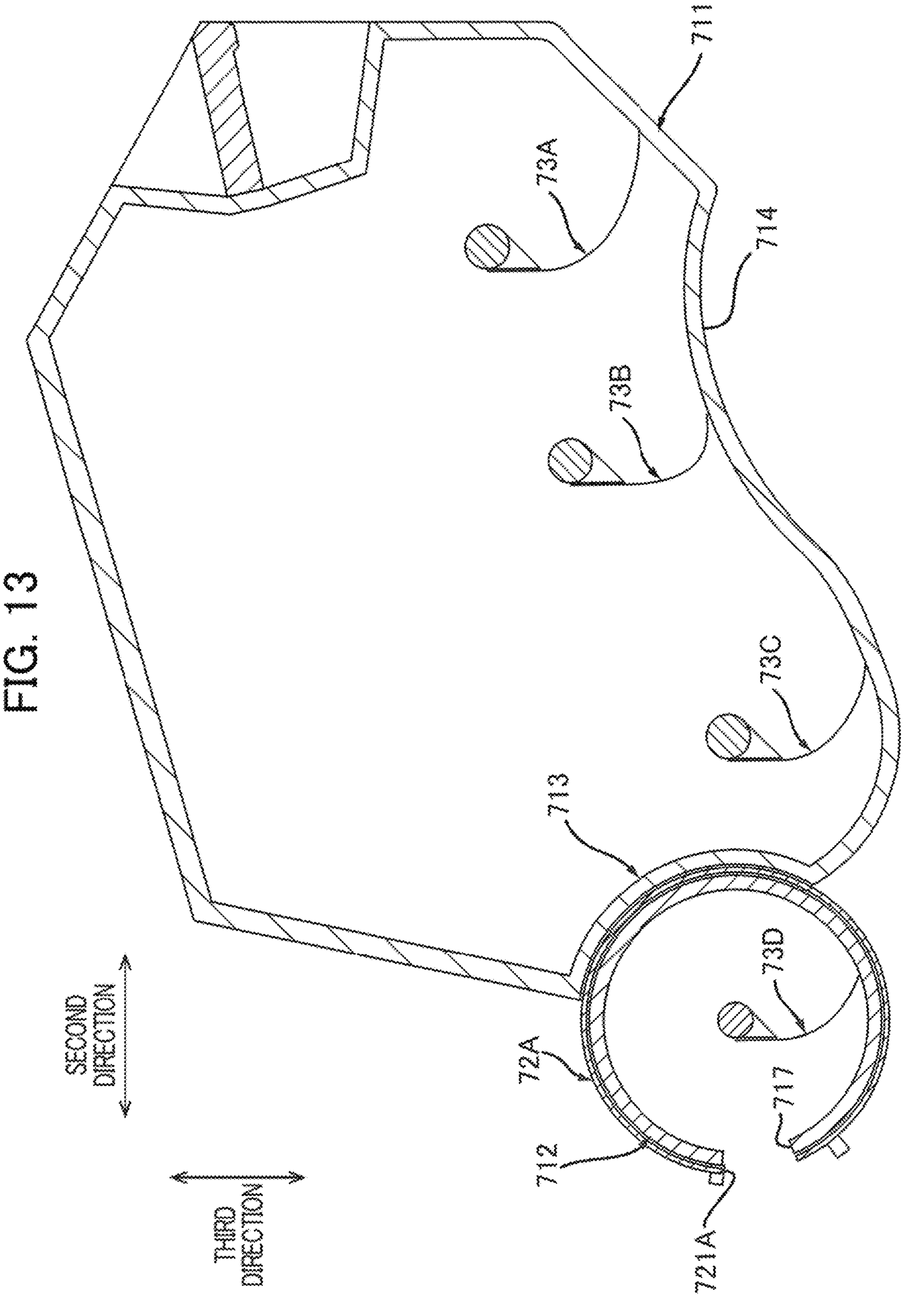
FIG. 13 is a view of the toner cartridge illustrated in FIG. 12, and illustrates a state where the toner shutter is located at the toner first opening position.

As illustrated in FIG. 9, the toner shutter 72A is positioned at the center portion of the second storage section 712 in the first direction. The toner shutter 72A is positioned on the outer peripheral surface of the second storage section 712. The toner shutter 72A extends in the first direction. The toner shutter 72A is configured to open and close the discharge port 717. For more details, as illustrated in FIGS. 12 and 13, the toner shutter 72A is movable between a toner first closing position (see FIG. 12) and a toner first opening position (see FIG. 13). The toner shutter 72A closes the discharge port 717 in a state where the toner shutter 72A is located at the toner first closing position. The toner shutter 72A opens the discharge port 717 in a state where the toner shutter 72A is located at the toner first opening position.

As illustrated in FIG. 9, the toner shutter 72A has a shutter opening 721A and two engagement parts 722A and 723A.

The shutter opening 721A is positioned at the center portion of the toner shutter 72A in the first direction. As illustrated in FIG. 12, the shutter opening 721A is positioned apart from the discharge port 717 in a state where the toner shutter 72A is located at the toner first closing position. In this state, the shutter opening 721A is not in communication with the discharge port 717. As illustrated in FIG. 13, the shutter opening 721A is in communication with the discharge port 717 in a state where the toner shutter 72A is located at the toner first opening position.

As illustrated in FIG. 9, the engagement part 722A is positioned at one end portion of the toner shutter 72A in the first direction. The engagement part 722A is a protrusion.

The engagement part 723A is positioned at the other end portion of the toner shutter 72A in the first direction. The engagement part 723A is positioned apart from the engagement part 722A in the first direction. The shutter opening 721A is positioned between the engagement parts 722A and 723A in the first direction. The engagement part 723A is a protrusion.

The toner shutter 72B is positioned at the one end portion of the second storage section 712 in the first direction. The toner shutter 72B is positioned apart from the toner shutter 72A in the first direction. The toner shutter 72B is positioned on the outer peripheral surface of the second storage section 712. The toner shutter 72B extends in the first direction. The toner shutter 72B is configured to open and close the receiving port 718A. For more details, the toner shutter 72B is movable between a toner second closing position (see FIG. 9) and a toner second opening position. The toner shutter 72B closes the receiving port 718A in a state where the toner shutter 72B is located at the toner second closing position. The toner shutter 72B opens the receiving port 718A in a state where the toner shutter 72B is located at the toner second opening position.

The toner shutter 72B has a shutter opening 721B and two engagement parts 722B and 723B.

The shutter opening 721B is positioned at the center portion of the toner shutter 72B in the first direction. The shutter opening 721B is positioned apart from the receiving port 718A in a state where the toner shutter 72B is located at the toner second closing position. In this state, the shutter opening 721B is not in communication with the receiving port 718A. The shutter opening 721B is in communication with the receiving port 718A in a state where the toner shutter 72B is located at the toner second opening position.

The engagement part 722B is positioned at one end portion of the toner shutter 72B in the first direction. The engagement part 722B is a protrusion.

The engagement part 723B is positioned at the other end portion of the toner shutter 72B in the first direction. The engagement part 723B is positioned apart from the engagement part 722B in the first direction. The shutter opening 721B is positioned between the engagement parts 722B and 723B in the first direction. The engagement part 723B is a protrusion.

The toner shutter 72C is positioned at the other end portion of the second storage section 712 in the first direction. The toner shutter 72C is positioned apart from the toner shutter 72A in the first direction. The toner shutter 72C is positioned on the outer peripheral surface of the second storage section 712. The toner shutter 72C extends in the first direction. The toner shutter 72C is configured to open and close the receiving port 718B. For more details, the toner shutter 72C is movable between a toner third closing position (see FIG. 9) and a toner third opening position. The toner shutter 72C closes the receiving port 718B in a state where the toner shutter 72C is located at the toner third closing position. The toner shutter 72C opens the receiving port 718B in a state where the toner shutter 72C is located at the toner third opening position.

The toner shutter 72C has a shutter opening 721C and two engagement parts 722C and 723C.

The shutter opening 721C is positioned at the center portion of the toner shutter 72C in the first direction. The shutter opening 721C is positioned apart from the receiving port 718B in a state where the toner shutter 72C is located at the toner third closing position. In this state, the shutter opening 721C is not in communication with the receiving port 718B. The shutter opening 721C is in communication with the receiving port 718B in a state where the toner shutter 72C is located at the toner third opening position.

The engagement part 722C is positioned at one end portion of the toner shutter 72C in the first direction. The engagement part 722C is a protrusion.

The engagement part 723C is positioned at the other end portion of the toner shutter 72C in the first direction. The engagement part 723C is positioned apart from the engagement part 722C in the first direction. The shutter opening 721C is positioned between the engagement parts 722C and 723C in the first direction. The engagement part 723C is a protrusion.

3.3 Agitators 73A, 73B, 73C, 73D

As illustrated in FIG. 10, the agitator 73A is positioned in the first storage section 711. The agitator 73A is positioned inside one end portion of the first storage section 711 in the second direction. The agitator 73A is configured to convey toner stored in the first storage section 711 toward the second storage section 712. The agitator 73A has one end portion and the other end portion in the first direction.

The agitator 73B is positioned in the first storage section 711. The agitator 73B is positioned between the agitator 73A and the second storage section 712 in the second direction. The agitator 73B is configured to convey toner stored in the first storage section 711 toward the second storage section 712. The agitator 73B has one end portion and the other end portion in the first direction.

The agitator 73C is positioned in the first storage section 711. The agitator 73C is positioned between the agitator 73B and the second storage section 712 in the second direction. The agitator 73C is configured to convey toner stored in the first storage section 711 toward the second storage section 712. The agitator 73C has one end portion and the other end portion in the first direction.

The agitator 73D is positioned in the second storage section 712. The agitator 73D is configured to convey toner stored in the second storage section 712 toward the discharge port 717. The agitator 73D has one end portion and the other end portion in the first direction.

3.4 Coupling

As illustrated in FIG. 10, the first storage section 711 has one side surface and the other side surface in the first direction. As illustrated in FIG. 10, the coupling 74 is positioned on the other side surface of the first storage section 711 in the first direction. The coupling 74 is mounted on the other end portion of the agitator 73B in the first direction. The coupling 74 is rotatable together with the agitator 73B. The coupling 74 has a joint 741 and a coupling gear 742 rotatable together with the joint 741.

In a state where the toner cartridge 7 is coupled to the drum cartridge 6 and the drum cartridge 6 and the toner cartridge 7 are located at the drum first position and the toner first position, respectively, a main body coupling (not illustrated) is fitted in the joint 741. In a state where the main body coupling is fitted in the joint 741, the coupling 74 is rotatable together with the main body coupling. The coupling 74 is configured to rotate by receiving power from the main body coupling.

3.5 Gears 75A, 75B, 75C, 75D, 75E, 75F, 75G

Figure 14:
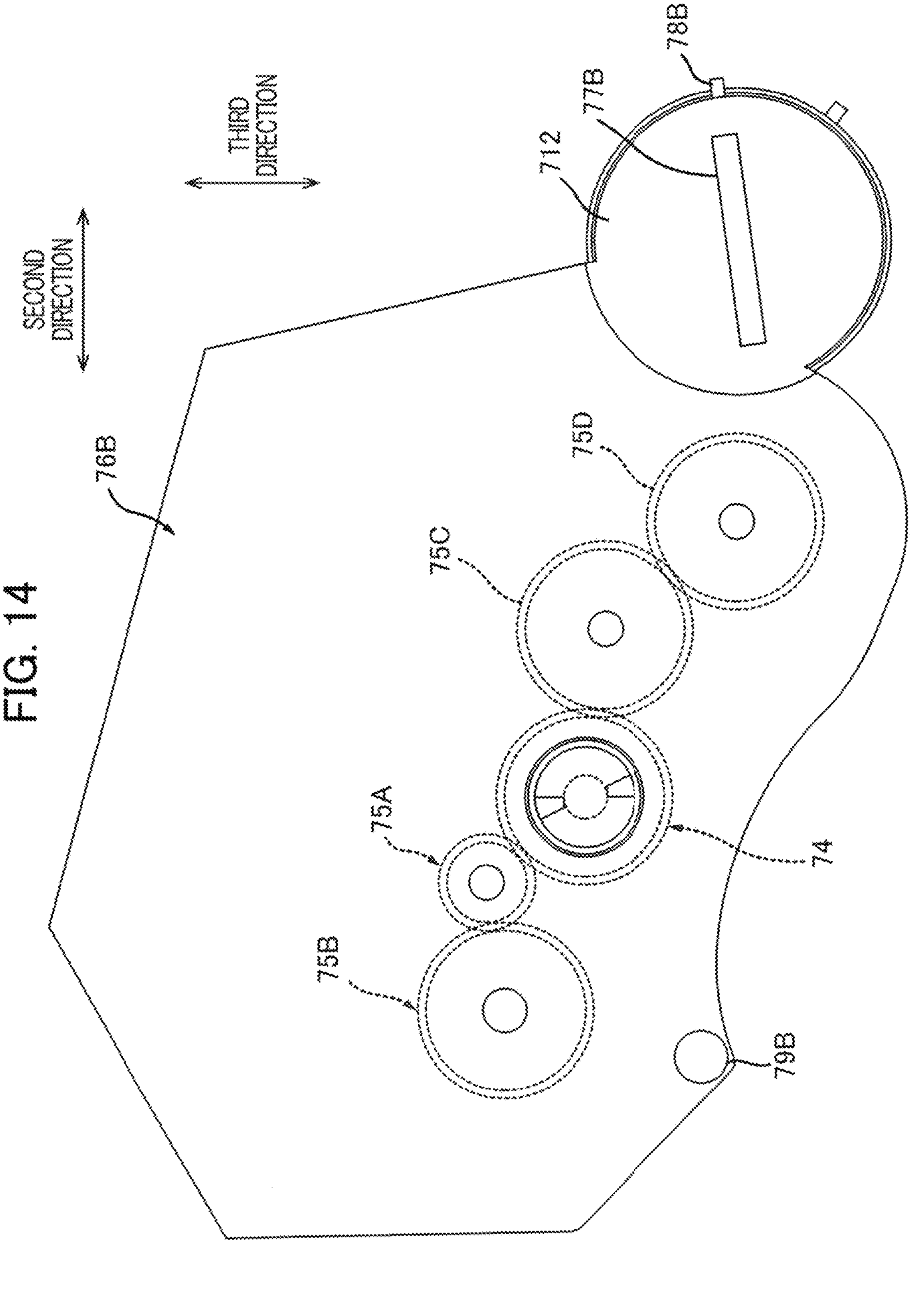
FIG. 14 is a side view of the toner cartridge illustrated in FIG. 9 as viewed in a first direction toward one side from the other side.

As illustrated in FIG. 14, the gears 75A, 75B, 75C, and 75D are positioned on the other side surface of the first storage section 711 in the first direction. The gear 75A is meshingly engaged with the coupling gear 742. The gear 75B is meshingly engaged with the gear 75A. As illustrated in FIG. 10, the gear 75B is mounted on the other end portion of the agitator 73A in the first direction. The gear 75B is rotatable together with the agitator 73A. As illustrated in FIG. 14, the gear 75C is meshingly engaged with the coupling gear 742. The gear 75C is positioned apart from the gear 75A. The gear 75D is meshingly engaged with the gear 75C. As illustrated in FIG. 10, the gear 75D is mounted on the other end portion of the agitator 73C in the first direction. The gear 75D is rotatable together with the agitator 73C.

Figure 15:
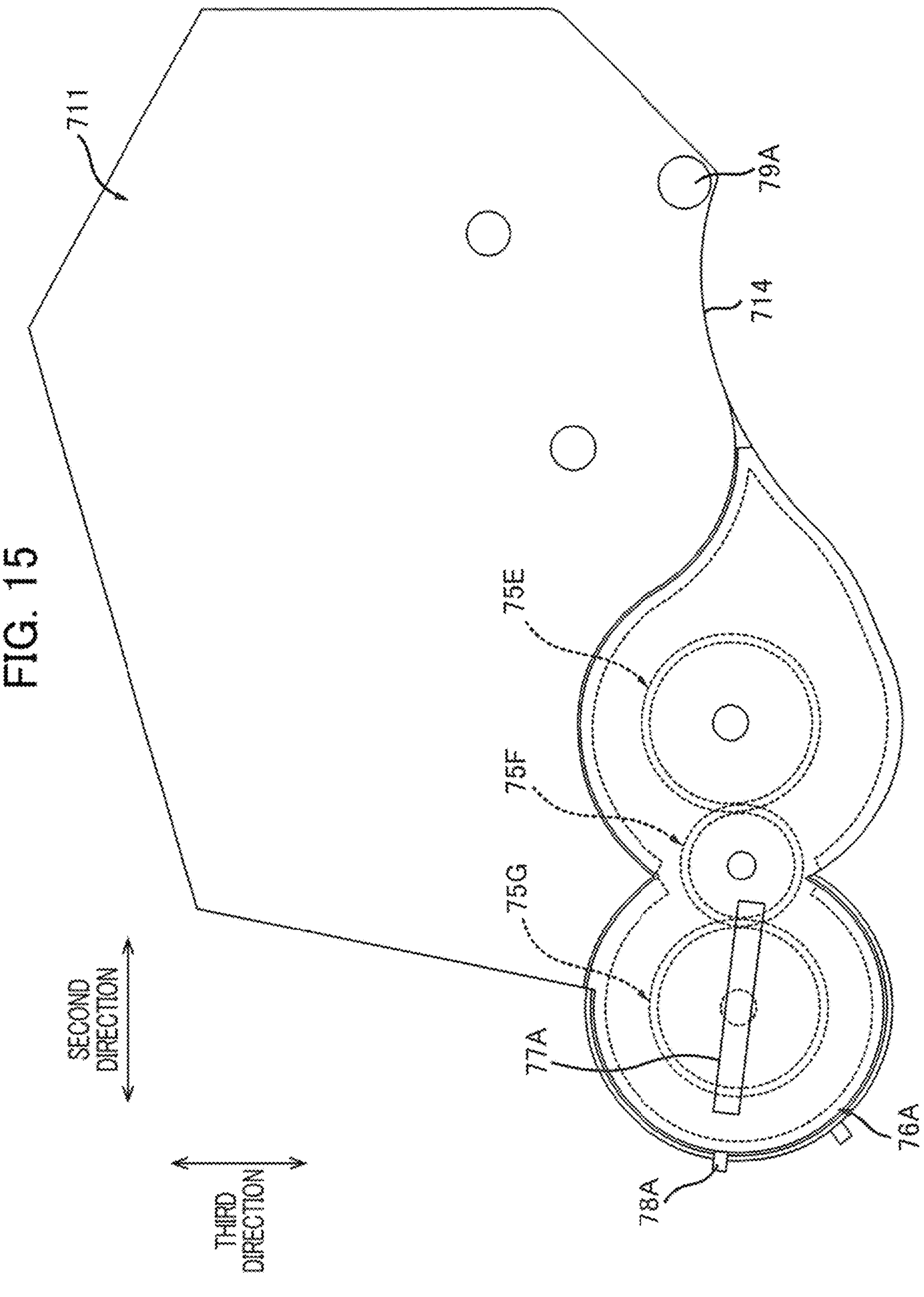
FIG. 15 is a side view of the toner cartridge illustrated in FIG. 9 as viewed in the first direction toward the other side from the one side.

As illustrated in FIG. 15, the gears 75E, 75F, and 75G are positioned on the one side surface of the first storage section 711 in the first direction and on one side surface of the second storage section 712 in the first direction. As illustrated in FIG. 10, the gear 75E is mounted on the one end portion of the agitator 73C in the first direction. The gear 75E is rotatable together with the agitator 73C. The gear 75F is meshingly engaged with the gear 75E. The gear 75G is meshingly engaged with the gear 75F. The gear 75G is mounted on the one end portion of the agitator 73D in the first direction. The gear 75G is rotatable together with the agitator 73D.

3.6 Gear Covers 76A, 76B

As illustrated in FIG. 10, the gear cover 76A is mounted on one side surface of the toner housing 71 in the first direction. The gear cover 76A covers the gears 75E, 75F, and 75G.

The gear cover 76B is mounted on the other side surface of the toner housing 71 in the first direction. The gear cover 76B covers the gears 75A, 75B, 75C, 75D, and coupling gear 742 but exposes the joint 741.

3.7 Ribs 77A, 77B

As illustrated in FIG. 9, the rib 77A is positioned at one end portion of the toner cartridge 7 in the first direction. The rib 77A is positioned on the opposite side of the second storage section 712 from the rib 77B in the first direction. The rib 77A protrudes from the gear cover 76A in the first direction. The rib 77A extends in the radial direction of the second storage section 712. The rib 77A extends in the second direction.

The rib 77B is positioned at the other end portion of the toner cartridge 7 in the first direction. The rib 77B is positioned on the opposite side of the second storage section 712 from the rib 77A in the first direction. The rib 77B protrudes from the other end surface (i.e., the other side surface) of the second storage section 712 in the first direction. The rib 77B extends in the radial direction of the second storage section 712. The rib 77B extends in the second direction. The rib 77B extends in the same direction as the extending direction of the rib 77A.

3.8 Engagement Parts 78A, 78B

As illustrated in FIG. 9, the engagement part 78A is positioned at the one end portion of the toner cartridge 7 in the first direction. The engagement part 78A is positioned at the one end portion of the toner cartridge 7 in the second direction. For more details, the engagement part 78A is positioned at one end portion of the gear cover 76A in the second direction. The engagement part 78A is a protrusion. The engagement part 78A extends in the second direction.

The engagement part 78B is positioned at the other end portion of the toner cartridge 7 in the first direction. For more details, the engagement part 78B is positioned at the other end portion of the second storage section 712 in the first direction. The engagement part 78B is positioned at the one end portion of the toner cartridge 7 in the second direction. The engagement part 78B is a protrusion. The engagement part 78B extends in the second direction from the outer peripheral surface of the second storage section 712.

3.9 Protrusions 79A, 79B

As illustrated in FIG. 9, the protrusion 79A is positioned at the one end portion of the toner cartridge 7 in the first direction. The protrusion 79A is positioned at the other end portion of the toner cartridge 7 in the second direction. The protrusion 79A is positioned on the opposite side of the first storage section 711 from the protrusion 79B in the first direction. The protrusion 79A extends from the one side surface of the first storage section 711 in the first direction. The protrusion 79A extends in the first direction. The protrusion 79A has a cylindrical shape.

The protrusion 79B is positioned at the other end portion of the toner cartridge 7 in the first direction. The protrusion 79B is positioned at the other end portion of the toner cartridge 7 in the second direction. The protrusion 79B is positioned on the opposite side of the first storage section 711 from the protrusion 79A in the first direction. The protrusion 79B extends from the outer surface of the gear cover 76B in the first direction. The protrusion 79B extends in the first direction. The protrusion 79B has a cylindrical shape.

3.7 Coupling of Toner Cartridge 7 to Drum Cartridge 6

Figure 16:
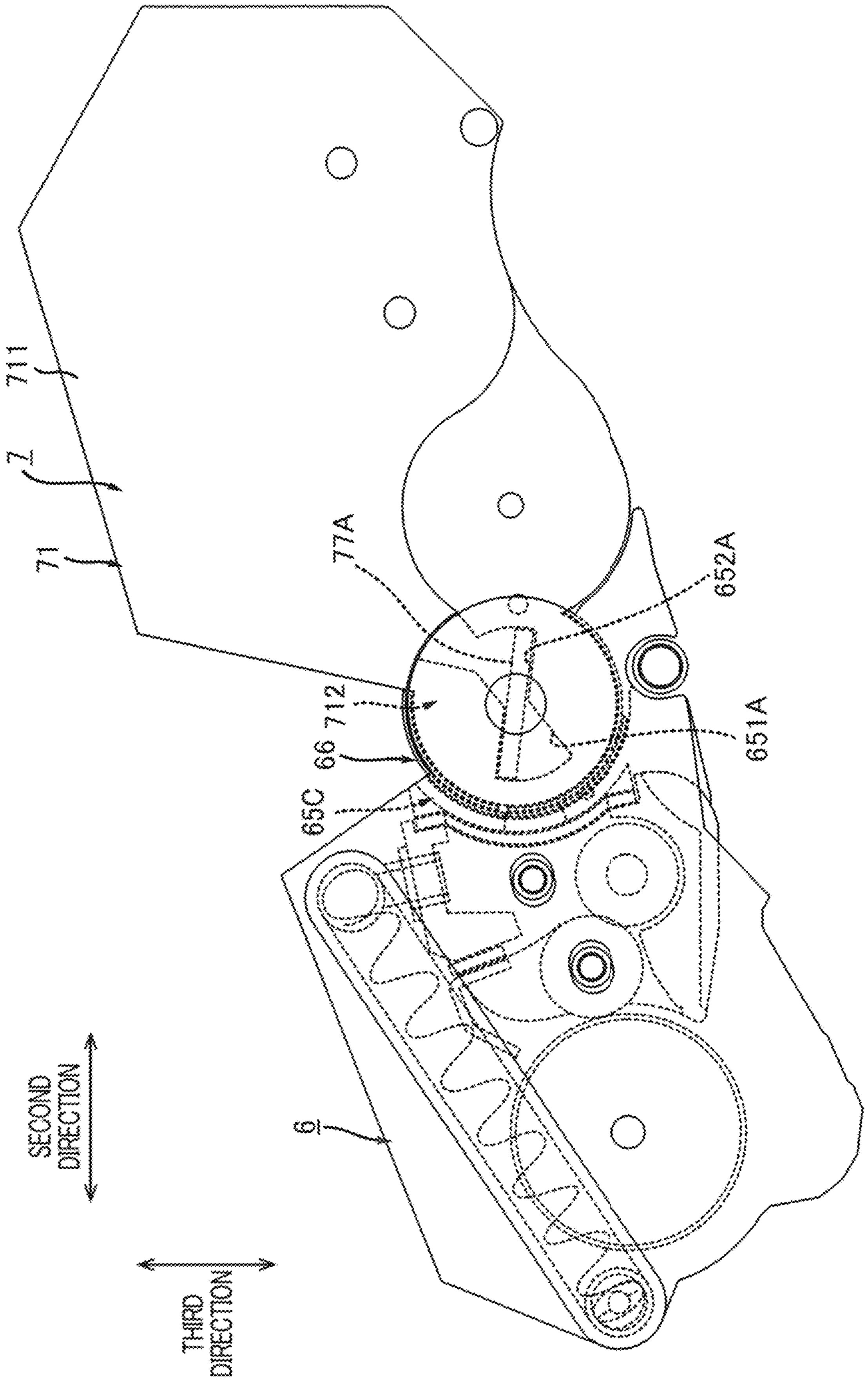
FIG. 16 is a view for explaining coupling of the toner cartridge to the drum cartridge, and illustrates a state where the toner cartridge is coupled to the drum cartridge and the toner cartridge is located at the first pivot position.
Figure 17:
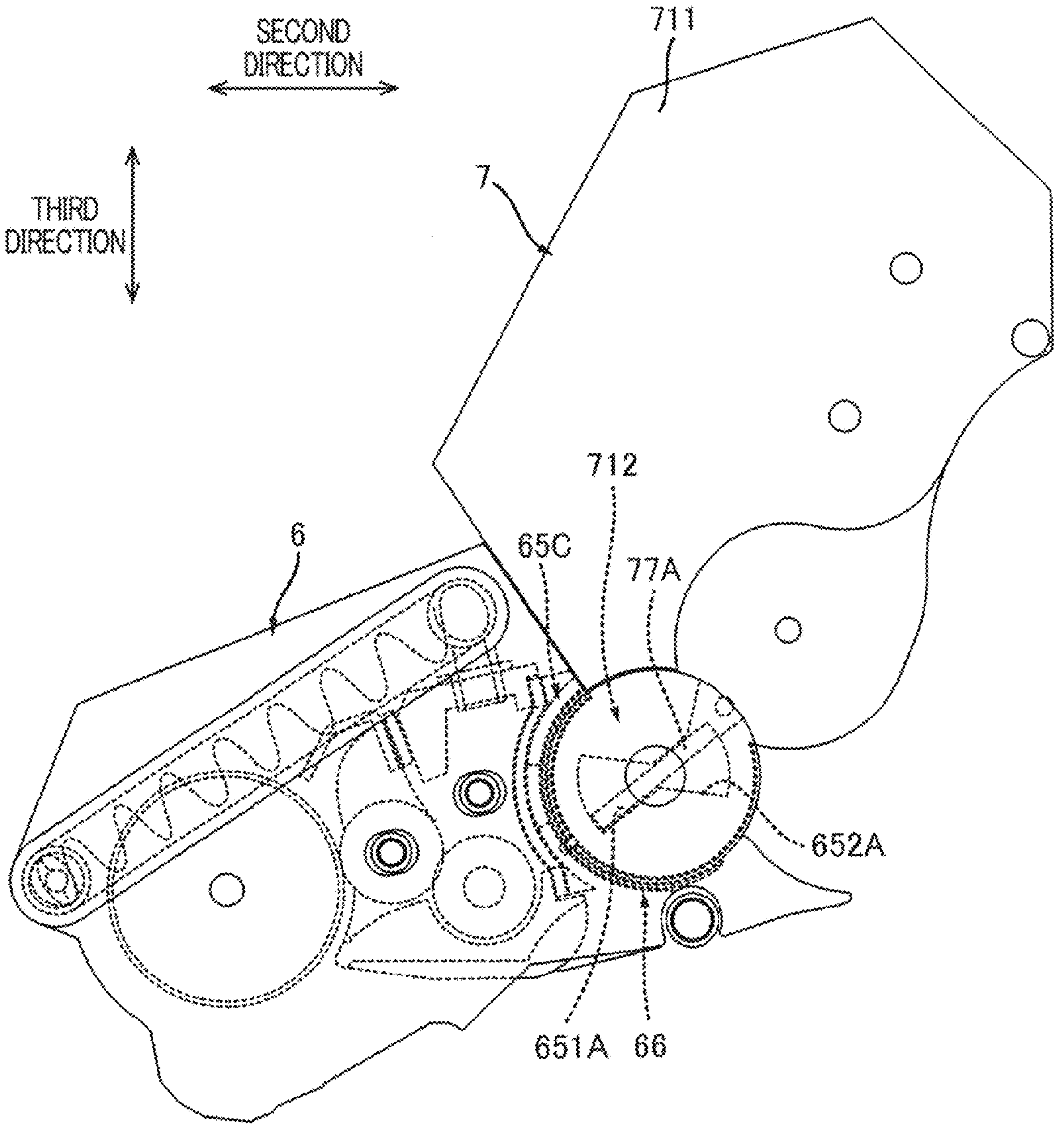
FIG. 17 is a view for explaining, in cooperation with FIG. 16, the coupling of the toner cartridge to the drum cartridge, and illustrates a state where the toner cartridge is coupled to the drum cartridge and the toner cartridge is located at a second pivot position.

As illustrated in FIGS. 16 and 17, the toner cartridge 7 is pivotally movable between a first pivot position (see FIG. 16) and a second pivot position (see FIG. 17) relative to the drum cartridge 6 in a state where the toner cartridge 7 is coupled to the drum cartridge 6.

The second storage section 712 of the toner cartridge 7 is coupled to the third frame 65C of the drum cartridge 6 in the state where the toner cartridge 7 is coupled to the drum cartridge 6.

Further, in the state where the toner cartridge 7 is coupled to the drum cartridge 6, the engagement part 78A (see FIG. 9) of the toner cartridge 7 is fitted in the engagement hole 662A (see FIG. 3) of the developing shutter 66 and the engagement part 78B (see FIG. 9) of the toner cartridge 7 is fitted in the engagement hole 662B (see FIG. 3) of the developing shutter 66. As a result, the developing shutter 66 can be moved together with the toner housing 71 in the state where the toner cartridge 7 is coupled to the drum cartridge 6.

Further, in the state where the toner cartridge 7 is coupled to the drum cartridge 6, the engagement part 722A (see FIG. 9) of the toner shutter 72A is fitted in the engagement hole 657A (see FIG. 3) of the third frame 65C through the slit 663A (see FIG. 3) of the developing shutter 66, and the engagement part 723A (see FIG. 9) of the toner shutter 72A is fitted in the engagement hole 657B (see FIG. 3) of the third frame 65C through the slit 663B (see FIG. 3) of the developing shutter 66. As a result, in the state where the toner cartridge 7 is coupled to the drum cartridge 6, the toner shutter 72A is fixed to the third frame 65C.

Further, in the state where the toner cartridge 7 is coupled to the drum cartridge 6, the engagement part 722B (see FIG. 9) of the toner shutter 72B is fitted in the engagement hole 658A (see FIG. 3) of the third frame 65C through the slit 664A (see FIG. 3) of the developing shutter 66, and the engagement part 723B (see FIG. 9) of the toner shutter 72B is fitted in the engagement hole 658B (see FIG. 3) of the third frame 65C through the slit 664B (see FIG. 3) of the developing shutter 66. As a result, in the state where the toner cartridge 7 is coupled to the drum cartridge 6, the toner shutter 72B is fixed to the third frame 65C.

Further, in the state where the toner cartridge 7 is coupled to the drum cartridge 6, the engagement part 722C (see FIG. 9) of the toner shutter 72C is fitted in the engagement hole 659A (see FIG. 3) of the third frame 65C through the slit 665A (see FIG. 3) of the developing shutter 66, and the engagement part 723C (see FIG. 9) of the toner shutter 72C is fitted in the engagement hole 659B (see FIG. 3) of the third frame 65C through the slit 665B (see FIG. 3) of the developing shutter 66. As a result, in the state where the toner cartridge 7 is coupled to the drum cartridge 6, the toner shutter 72C is fixed to the third frame 65C.

When the toner cartridge 7 is pivotally moved from the first pivot position (see FIG. 16) to the second pivot position (see FIG. 17) in the state where the toner cartridge 7 is coupled to the drum cartridge 6, the developing shutter 66 is moved from the developing opening position (see FIG. 7) to the developing closing position (see FIG. 6) together with the toner housing 71.

At this time, the toner housing 71 is pivotally moved with the toner shutters 72A, 72B, and 72C fixed to the third frame 65C. As a result, the toner shutter 72A is moved relative to the toner housing 71 from the toner first opening position (see FIG. 13) to the toner first closing position (see FIG. 12), the toner shutter 72B is moved relative to the toner housing 71 from the toner second opening position to the toner second closing position, and the toner shutter 72C is moved relative to the toner housing 71 from the toner third opening position to the toner third closing position.

That is, in a state where the toner cartridge 7 is coupled to the drum cartridge 6 and the toner cartridge 7 is located at the second pivot position with respect to the drum cartridge 6, toner stored in the toner cartridge 7 is not supplied to the developing housing 631.

As illustrated in FIG. 17, in a state where the toner cartridge 7 is coupled to the drum cartridge 6, the rib 77A of the toner cartridge 7 is configured to be fitted in the guide part 651A of the drum cartridge 6, and the rib 77B (see FIG. 9) of the toner cartridge 7 is configured to be fitted in the guide part 651B (see FIG. 3) of the drum cartridge 6. This structure allows the coupling of the toner cartridge 7 to the drum cartridge 6 to be released (i.e., is releasable) in a state where the toner cartridge 7 is located at the second pivot position relative to the drum cartridge 6. In other words, in a state where the toner cartridge 7 is coupled to the drum cartridge 6, the developing shutter 66 is located at the developing closing position, and the toner shutters 72A, 72B, and 72C are respectively located at the toner first closing position, the toner second closing position, and the toner third closing position, the coupling of the toner cartridge 7 to the drum cartridge 6 can be released.

When the toner cartridge 7 is pivotally moved from the second pivot position (see FIG. 17) to the first pivot position (FIG. 16) in a state where the toner cartridge 7 is coupled to the drum cartridge 6, the developing shutter 66 is moved from the developing closing position (see FIG. 6) to the developing opening position (see FIG. 7) together with the toner housing 71.

At this time, the toner housing 71 is pivotally moved with the toner shutters 72A, 72B, and 72C fixed to the third frame 65C. As a result, the toner shutter 72A is moved relative to the toner housing 71 from the toner first closing position (see FIG. 12) to the toner first opening position (see FIG. 13), the toner shutter 72B is moved relative to the toner housing 71 from the toner second closing position to the toner second opening position, and the toner shutter 72C is moved relative to the toner housing 71 from the toner third closing position to the toner third opening position.

As illustrated in FIG. 7, in a state where the toner cartridge 7 is coupled to the drum cartridge 6 and the toner cartridge 7 is located at the first pivot position with respect to the drum cartridge 6, the discharge port 717 of the toner cartridge 7 is in communication with the passage port 655 of the third frame 65C. Further, in this state, the receiving port 718A (see FIG. 9) of the toner cartridge 7 is in communication with the passage port 656A (see FIG. 3) of the third frame 65C, and the receiving port 718B (see FIG. 9) of the toner cartridge 7 is in communication with the passage port 656B (see FIG. 3) of the third frame 65C.

Thus, in a state where the toner cartridge 7 is coupled to the drum cartridge 6 and the toner cartridge 7 is located at the first pivot position relative to the drum cartridge 6, toner from the discharge port 717 of the toner cartridge 7 can pass through the passage port 655, and toner from the developing housing 631 can pass through the passage ports 656A and 656B.

Further, in the state where the toner cartridge 7 is coupled to the drum cartridge 6 and the toner cartridge 7 is located at the first pivot position relative to the drum cartridge 6, the passage port 655 can receive toner from the toner cartridge 7, and the receiving ports 718A and 718B can receive toner from the developing housing 631. That is, the passage port 655 is a port for receiving toner from the toner cartridge 7, and the receiving ports 718A and 718B are each a port for receiving toner from the developing housing 631.

As illustrated in FIG. 16, in a state where the toner cartridge 7 is coupled to the drum cartridge 6, the rib 77A of the toner cartridge 7 is configured to be fitted in the locking part 652A of the drum cartridge 6, and the rib 77B (see FIG. 9) of the toner cartridge 7 is configured to be fitted in the locking part 652B (see FIG. 3) of the drum cartridge 6. Thus, the coupling of the toner cartridge 7 to the drum cartridge 6 cannot be released (i.e., is not releasable) in a state where the toner cartridge 7 is located at the first pivot position with respect to the drum cartridge 6. In other words, in a state where the toner cartridge 7 is coupled to the drum cartridge 6, the developing shutter 66 is located at the developing opening position, and the toner shutters 72A, 72B, and 72C are respectively located at the toner first opening position, the toner second opening position, and the toner third opening position, the coupling of the toner cartridge 7 to the drum cartridge 6 cannot be released.

Figure 18:
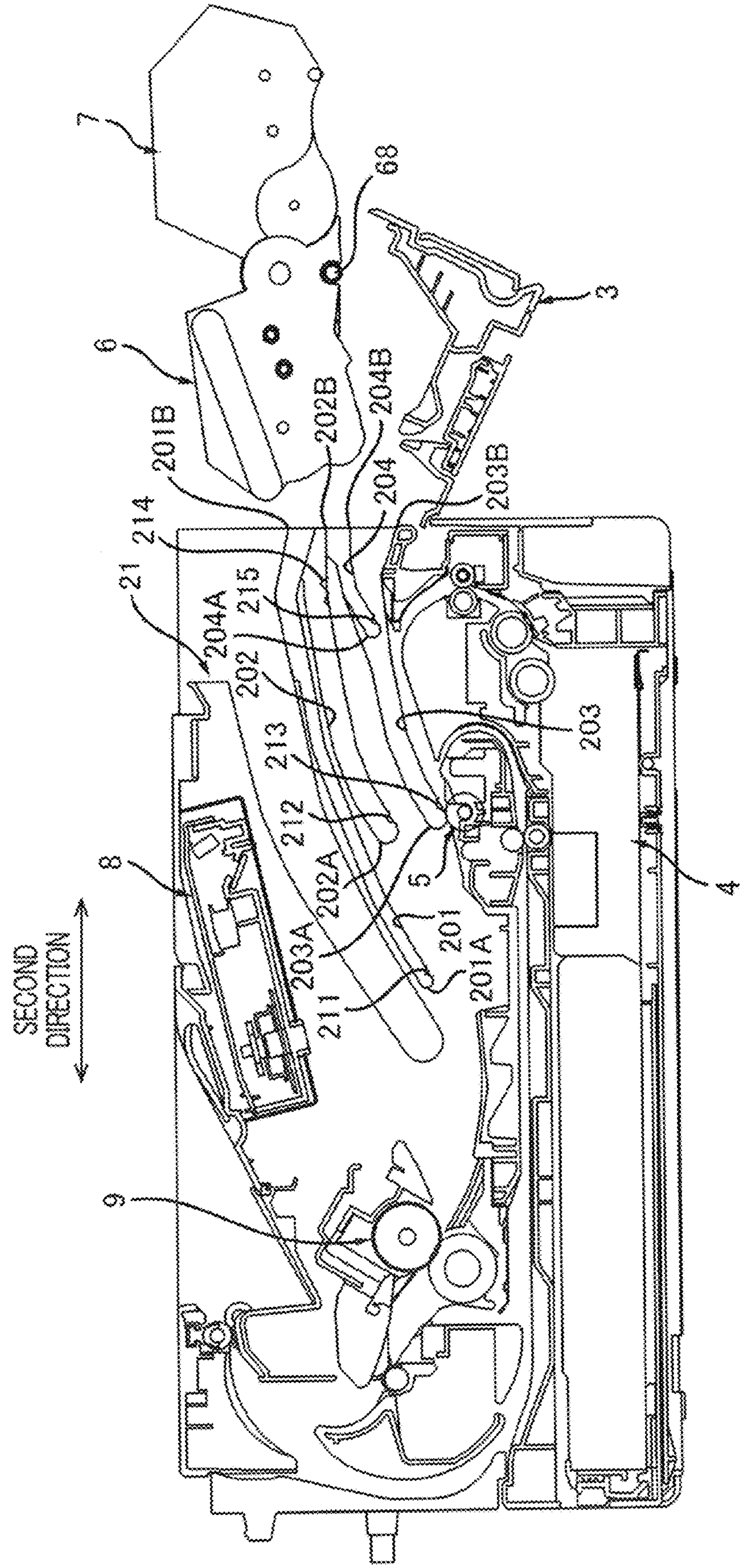
FIG. 18 is a view for explaining removal of the drum cartridge from a main body housing, and illustrates a state where the toner cartridge is coupled to the drum cartridge, the toner cartridge is located at the first pivot position, and the drum cartridge has been removed from the main body housing together with the toner cartridge.

As illustrated in FIG. 18, in a state where the toner cartridge 7 is coupled to the drum cartridge 6 and the toner cartridge 7 is located at the first pivot position with respect to the drum cartridge 6, the drum cartridge 6 can be removed from the main body housing 2 together with the toner cartridge 7.

4. Details of Main Body Housing 2

The following describes the details of the main body housing 2 with reference to FIG. 2 and FIGS. 18 to 20.

The main body housing 2 has a plurality of drum cartridge guides, a toner cartridge guide, and a plurality of stoppers at one end portion of the main body housing 2 in the first direction. As illustrated in FIG. 18, the main body housing 2 further has a plurality of drum cartridge guides 201, 202, and 203, a toner cartridge guide 204, and a plurality of stoppers 211, 212, 213, 214, and 215 at the other end portion of the main body housing 2 in the first direction. The plurality of drum cartridge guides, the toner cartridge guide, and the plurality of stoppers at the one end portion of the main body housing 2 in the first direction have substantially the same structures as the plurality of drum cartridge guides 201, 202, and 203, the toner cartridge guide 204, and the plurality of stoppers 211, 212, 213, 214, and 215 at the other end portion of the main body housing 2 in the first direction, respectively. Thus, a detailed description of those components at the one end portion of the main body housing 2 in the first direction will be omitted.

4.1 Drum Cartridge Guides 201, 202, 203

The drum cartridge guides 201, 202, and 203 are configured to guide the drum cartridge 6. More specifically, the drum cartridge guides 201, 202, and 203 are configured to guide the drum cartridge 6 during attachment and removal of the drum cartridge 6 to and from the main body housing 2.

For more details, the drum cartridge guide 201 is configured to guide the protrusion 601B (see FIG. 4) of the drum cartridge 6. The drum cartridge guide 201 extends in the second direction. The drum cartridge guide 201 has one end portion 201A and the other end portion 201B in the second direction. The one end portion 201A is positioned between the conveying roller 5 and the fixing device 9 in the second direction. The other end portion 201B is positioned in the opening 21.

The drum cartridge guide 202 is configured to guide the protrusion 602B (see FIG. 4) of the drum cartridge 6. The drum cartridge guide 202 is positioned on the other side of the drum cartridge guide 201 in the third direction. In other words, the drum cartridge guide 202 is positioned on the opposite side of the drum cartridge guide 201 from the exposing device 8 in the third direction. The drum cartridge guide 202 extends in the second direction. The drum cartridge guide 202 has one end portion 202A and the other end portion 202B in the second direction. The one end portion 202A is positioned on one side of the conveying roller 5 in the third direction. In other words, the one end portion 202A is positioned on the opposite side of the conveying roller 5 from the sheet storage section 4 in the third direction. The other end portion 202B is positioned in the opening 21.

The drum cartridge guide 203 is configured to guide the protrusion 603B (see FIG. 4) of the drum cartridge 6. The drum cartridge guide 203 is positioned on the other side of the drum cartridge guide 202 in the third direction. In other words, the drum cartridge guide 203 is positioned on the opposite side of the drum cartridge guide 202 from the drum cartridge guide 201 in the third direction. The drum cartridge guide 203 extends in the second direction. The drum cartridge guide 203 has one end portion 203A and the other end portion 203B in the second direction. The one end portion 203A is positioned between the one end portion 202A of the drum cartridge guide 202 and the conveying roller 5 in the third direction. The other end portion 203B is positioned in the opening 21.

In a state where the drum cartridge 6 is located at the drum first position illustrated in FIG. 1, the protrusion 601B of the drum cartridge 6 is fitted in the one end portion 201A (see FIG. 18) of the drum cartridge guide 201, the protrusion 602B of the drum cartridge 6 is fitted in the one end portion 202A (see FIG. 18) of the drum cartridge guide 202, and the protrusion 603B of the drum cartridge 6 is fitted in the one end portion 203A (see FIG. 18) of the drum cartridge guide 203.

As illustrated in FIG. 2, in a state where the drum cartridge 6 is located at the drum second position, the protrusion 601B of the drum cartridge 6 is fitted in a portion of the drum cartridge guide 201 between the one end portion 201A and the other end portion 201B, the protrusion 602B of the drum cartridge 6 is fitted in a portion of the drum cartridge guide 202 between the one end portion 202A and the other end portion 202B, and the protrusion 603B of the drum cartridge 6 is fitted in a portion of the drum cartridge guide 203 between the one end portion 203A and the other end portion 203B.

4.2 Toner Cartridge Guide 204

The toner cartridge guide 204 illustrated in FIG. 18 is configured to guide the toner cartridge 7. More specifically, the toner cartridge guide 204 is configured to guide the toner cartridge 7 during attachment and removal of the toner cartridge 7 to and from the main body housing 2.

For more details, the toner cartridge guide 204 is configured to guide the protrusion 79B of the toner cartridge 7. The toner cartridge guide 204 is positioned in the drum cartridge guide 203. The toner cartridge guide 204 extends in the second direction. The toner cartridge guide 204 has one end portion 204A and the other end portion 204B in the second direction. The one end portion 204A is positioned between the one end portion 203A and the other end portion 203B of the drum cartridge guide 203 in the second direction. The other end portion 204B is positioned in the opening 21.

Figure 19:
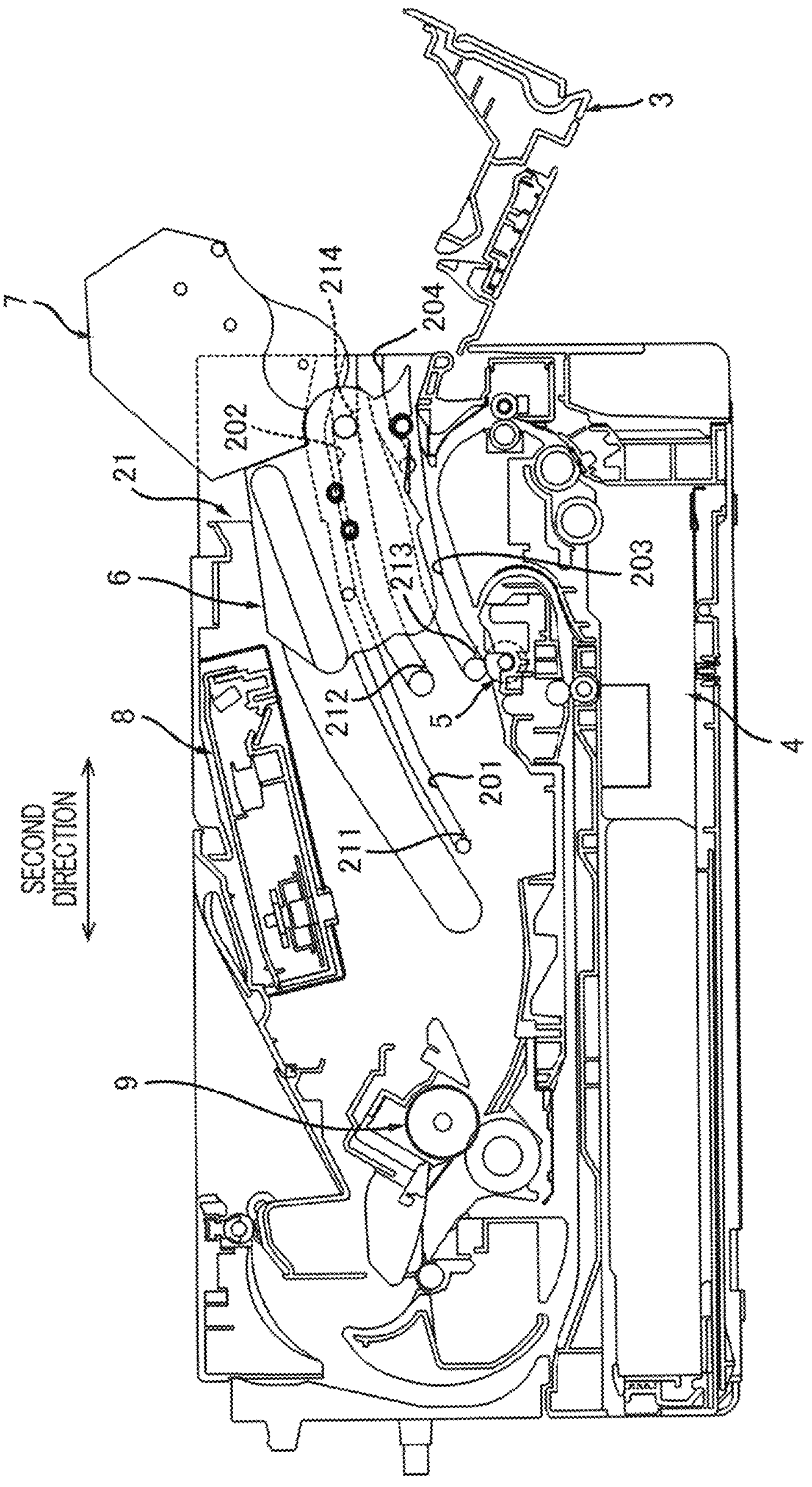
FIG. 19 is a view for explaining removal of the drum cartridge from the main body housing, and illustrates a state where the toner cartridge is coupled to the drum cartridge, the drum cartridge is located at the drum second position, the toner cartridge is located at the toner second position, and the toner cartridge is located at the second pivot position relative to the drum cartridge.

As illustrated in FIGS. 2 and 19, in a state where the toner cartridge 7 is coupled to the drum cartridge 6, the drum cartridge 6 is located at the drum second position, and the toner cartridge 7 is located at the toner second position, the toner cartridge 7 is disengaged from the toner cartridge guide 204 and is thus pivotally movable between the first pivot position (see FIG. 2) and the second pivot position (see FIG. 19).

Therefore, as illustrated in FIG. 19, in the state where the toner cartridge 7 is coupled to the drum cartridge 6, the drum cartridge 6 is located at the drum second position, and the toner cartridge 7 is located at the toner second position, the coupling of the toner cartridge 7 to the drum cartridge 6 becomes releasable by placing the toner cartridge 7 in the second pivot position relative to the drum cartridge 6.

Figure 20:
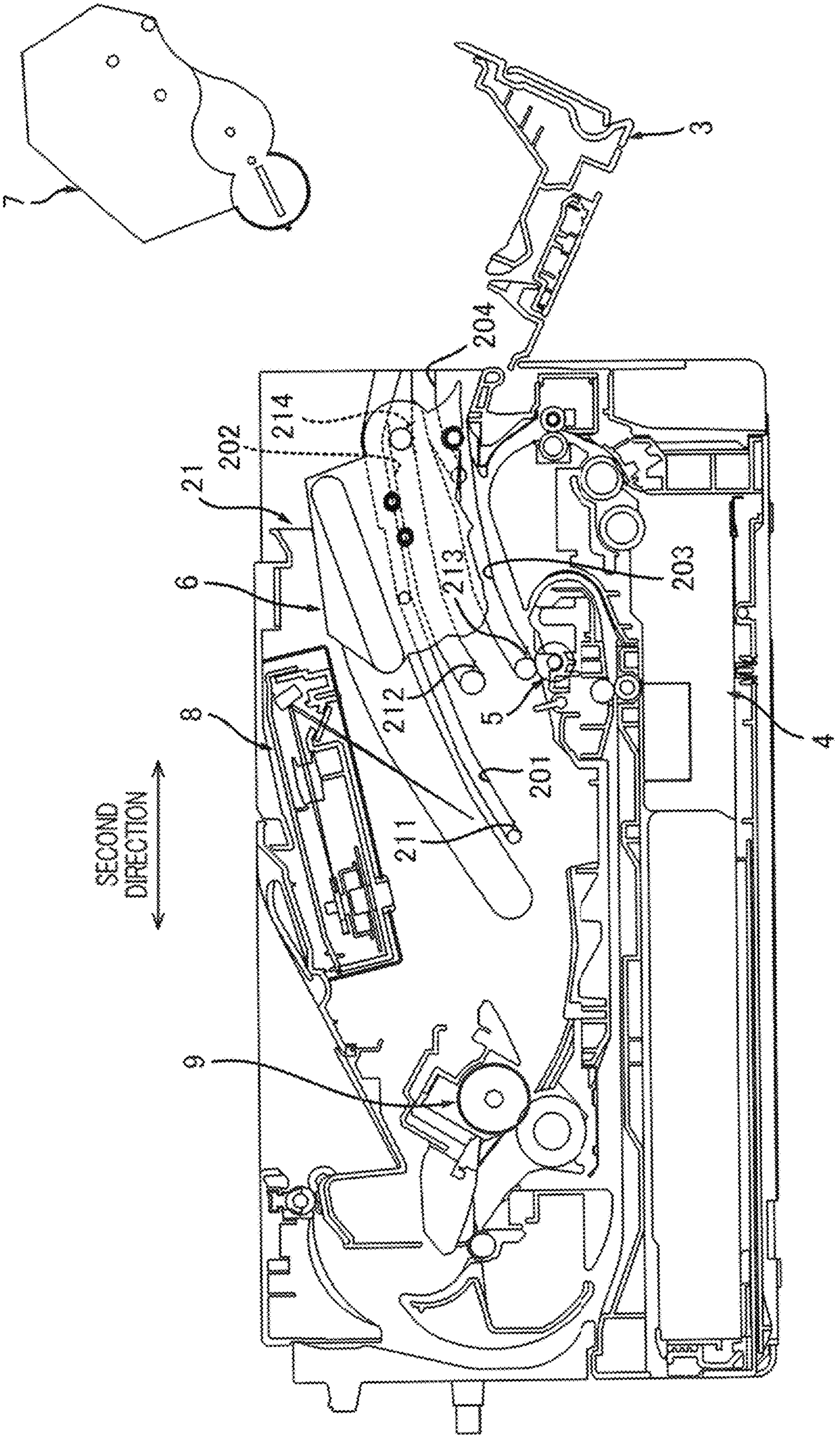
FIG. 20 is a view for explaining, in cooperation with FIG. 19, the removal of the drum cartridge from the main body housing, and illustrates a state where the coupling of the toner cartridge to the drum cartridge has been released and the toner cartridge has been removed from the main body housing.

Accordingly, as illustrated in FIG. 20, the toner cartridge 7 can be removed from the main body housing 2 with the drum cartridge 6 left at the drum second position.

4.3 Stoppers 211, 212, 213, 214, 215

The stoppers 211, 212, and 213 are configured to hold the drum cartridge 6 at the drum first position (see FIG. 1).

For more details, the stopper 211 is positioned in the drum cartridge guide 201. The stopper 211 is a leaf spring. The stopper 211 presses the protrusion 601B of the drum cartridge 6 toward the one end portion 201A of the drum cartridge guide 201 in a state where the drum cartridge 6 is located at the drum first position.

The stopper 212 is positioned in the drum cartridge guide 202. The stopper 212 is a leaf spring. The stopper 212 presses the protrusion 602B of the drum cartridge 6 toward the one end portion 202A of the drum cartridge guide 202 in a state where the drum cartridge 6 is located at the drum first position.

The stopper 213 is positioned in the drum cartridge guide 203. The stopper 213 is a leaf spring. The stopper 213 presses the protrusion 603B of the drum cartridge 6 toward the one end portion 203A of the drum cartridge guide 203 in a state where the drum cartridge 6 is located at the drum first position.

The stopper 214 is configured to hold the drum cartridge 6 at the drum second position (see FIG. 2). The stopper 214 is positioned in the drum cartridge guide 202. The stopper 214 is positioned between the stopper 212 and the other end portion 202B of the drum cartridge guide 202. The stopper 214 is a leaf spring. The stopper 214 presses the protrusion 602B of the drum cartridge 6 toward one side in the third direction (i.e., toward the drum cartridge guide 201 in the third direction) in a state where the drum cartridge 6 is located at the drum second position.

The stopper 215 is configured to hold the toner cartridge 7 at the toner first position (see FIG. 1). The stopper 215 is positioned in the toner cartridge guide 204. The stopper 215 is a leaf spring. The stopper 215 presses the protrusion 79B of the toner cartridge 7 toward the one end portion 204A of the toner cartridge guide 204 in a state where the toner cartridge 7 is located at the toner first position.

5. Function and Effect (1) In the image forming apparatus 1, as illustrated in FIG. 2, in a state where the toner cartridge 7 is coupled to the drum cartridge 6, the drum cartridge 6 is located at the drum second position, and the toner cartridge 7 is located at the toner second position (see FIG. 2), the coupling of the toner cartridge 7 to the drum cartridge 6 becomes releasable by placing the toner cartridge 7 in the second pivot position with respect to the drum cartridge 6 (see FIG. 19).

Thus, as illustrated in FIG. 20, the toner cartridge 7 can be removed from the main body housing 2 with the drum cartridge 6 left at the drum second position.

This allows the drum cartridge 6 and toner cartridge 7 to be replaced with new ones individually.

(2) In the image forming apparatus 1, as illustrated in FIG. 18, in a state where the toner cartridge 7 is coupled to the drum cartridge 6 and the toner cartridge 7 is located at the first pivot position relative to the drum cartridge 6, the drum cartridge 6 can be removed from the main body housing 2 together with the toner cartridge 7.

Thus, the drum cartridge 6 and toner cartridge 7 can be replaced with new ones individually as illustrated in FIG. 20, and further, when the user wishes to remove both the drum cartridge 6 and the toner cartridge 7 at a time from the main body housing 2, both the drum cartridge 6 and the toner cartridge 7 can be removed at a time from the main body housing 2 with the drum cartridge 6 and the toner cartridge 7 coupled to each other as illustrated in FIG. 18.

Examples of the cases where the user wishes to remove both the drum cartridge 6 and toner cartridge 7 at a time from the main body housing 2 include a case of removing, from the main body housing 2, the sheet S that has been jammed on the other side of the drum cartridge 6 and the toner cartridge 7 in the third direction (i.e., jammed in an area on the side of the drum cartridge 6 and toner cartridge 7 in the third direction where the sheet storage section 4 is located in the third direction).

(3) In the image forming apparatus 1, as illustrated in FIG. 1, the drum cartridge 6 includes the transfer roller 64.

Thus, the sheet S that has been jammed between the transfer roller 64 and the photosensitive drum 61 can be removed from the main body housing 2 by removing the drum cartridge 6 from the main body housing 2.

Thus, a sheet jam can be easily cleared.

Further, the transfer roller 64 covers the other end portion of the photosensitive drum 61 in the third direction (i.e., covers an end portion of the photosensitive drum 61 in the third direction that is closer to the sheet storage section 4), thereby suppressing the surface of the photosensitive drum 61 from being damaged when removing the drum cartridge 6 from the main body housing 2.

(4) As illustrated in FIG. 1, the transfer roller 64 is positioned between the photosensitive drum 61 and the sheet storage section 4 in a state where the drum cartridge 6 is located at the drum first position.

Thus, in the image forming apparatus 1 in which the transfer roller 64 is positioned between the photosensitive drum 61 and the sheet storage section 4, when the sheet S is jammed between the transfer roller 64 and the photosensitive drum 61, the sheet jam can be easily cleared by removing the drum cartridge 6 from the main body housing 2.

(5) In the image forming apparatus 1, as illustrated in FIG. 1, the drum cartridge 6 includes the conveying roller 5 and the opposing roller 68. The conveying roller 5 is configured to convey, toward the photosensitive drum 61, the sheet S fed from the sheet storage section 4 in a state where the drum cartridge 6 is located at the drum first position. The opposing roller 68 is configured to contact the conveying roller 5 in the state where the drum cartridge 6 is located at the drum first position.

Thus, as illustrated in FIG. 18, the opposing roller 68 can be separated from the conveying roller 5 by removing the drum cartridge 6 from the main body housing 2.

Accordingly, the sheet S that has been jammed between the conveying roller 5 and the opposing roller 68 can be easily removed by removing the drum cartridge 6 from the main body housing 2.

(6) In the image forming apparatus 1, as illustrated in FIG. 1, the toner cartridge 7 includes the sheet guide 714.

That is, the image forming apparatus 1 does not have a sheet guide other than the sheet guide 714 of the toner cartridge 7 on the other side of the toner cartridge 7 in the third direction (i.e., in an area on the side of the toner cartridge 7 in the third direction where the sheet storage section 4 is located.)

Thus, as compared with a configuration in which a sheet guide other than the sheet guide 714 of the toner cartridge 7 is provided on the other side of the toner cartridge 7 in the third direction (i.e., in an area on the side of the toner cartridge 7 in the third direction where the sheet storage section 4 is located), the size of the toner cartridge 7 in the third direction can be increased.

Further, in a state where the toner cartridge 7 is coupled to the drum cartridge 6, the drum cartridge 6 is located at the drum first position, and the toner cartridge 7 is located at the toner first position, the toner cartridge 7 is fixed relative to the photosensitive drum 61. Accordingly, the sheet guide 714 is fixed relative to the photosensitive drum 61.

This configuration allows the sheet S to be stably guided toward the photosensitive drum 61.

(7) In the image forming apparatus 1, as illustrated in FIG. 1, in a state where the toner cartridge 7 is coupled to the drum cartridge 6, the drum cartridge 6 is located at the drum first position, and the toner cartridge 7 is located at the toner first position, the first storage section 711 is positioned between the drum cartridge 6 and the cover 3.

Thus, irrespective of the structure and size of the drum cartridge 6, the capacity of the toner cartridge 7 can be increased by utilizing the space between the drum cartridge 6 and the cover 3.

(8) As illustrated in FIG. 1, in the image forming apparatus 1, the amount of toner that can be stored in the second storage section 712 is larger than the amount of toner that can be stored in the developing housing 631.

Thus, a sufficient amount of toner to be supplied to the developing housing 631 can be stored in the second storage section 712.

Further, the amount of toner that can be stored in the first storage section 711 is larger than the amount of toner that can be stored in the second storage section 712.

Thus, the capacity of the toner cartridge 7 can be increased by an increase in the size of the first storage section 711.

(9) In the image forming apparatus 1, as illustrated in FIG. 11, the length W2 of the second storage section 712 in the first direction is larger than the length W3 of the developing housing 631 in the first direction, and the length W1 of the first storage section 711 in the first direction is larger than the length W2 of the second storage section 712 in the first direction.

Thus, the capacity of the toner cartridge 7 can be increased by an increase in the size of the first storage section 711 in the first direction.

(10) As illustrated in FIG. 6, the seal member 67 is positioned around but apart from the passage port 655.

This configuration can suppress toner from contacting the seal member 67 when the toner is supplied from the toner cartridge 7 to the developing housing 631 through the passage port 655.

Accordingly, the flow of toner from the toner cartridge 7 toward the developing housing 631 can be suppressed from being blocked by the seal member 67.

As a result, toner can be suppressed from leaking from between the developing housing 631 and the third frame 65C, thereby enabling toner to be stably supplied from the toner cartridge 7 to the developing housing 631.

(11) In the image forming apparatus 1, as illustrated in FIG. 9, the second storage section 712 has the receiving ports 718A and 718B. Further, as illustrated in FIG. 3, the third frame 65C has the passage ports 656A and 656B.

In a state where the toner cartridge 7 is coupled to the drum cartridge 6 and the toner cartridge 7 is located at the first pivot position relative to the drum cartridge 6, toner stored in the developing housing 631 is returned to the second storage section 712 through the passage port 656A and receiving port 718A, and toner stored in the developing housing 631 is returned to the second storage section 712 through the passage port 656B and receiving port 718B.

That is, toner in the developing housing 631 can be returned to the toner cartridge 7 through the passage ports 656A and 656B.

This configuration allows toner to be circulated between the developing housing 631 and the toner cartridge 7.

As a result, toner stagnation in the developing housing 631 can be suppressed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. An image forming apparatus comprising:

a main body housing having an opening;

a drum cartridge comprising a photosensitive drum, the drum cartridge being movable inside the main body housing between a drum first position and a drum second position, the drum second position being closer to the opening than the drum first position is to the opening; and a toner cartridge configured to store therein toner, the toner cartridge being movable between a toner first position and a toner second position in a state where the toner cartridge is coupled to the drum cartridge, the toner cartridge being at the toner first position in a state where the drum cartridge is at the drum first position, the toner cartridge being at the toner second position in a state where the drum cartridge is at the drum second position, wherein the main body housing comprises:

a drum cartridge guide configured to guide the drum cartridge, the drum cartridge guide being disposed on a wall of the main body housing, the wall being immovable relative to the opening; and a toner cartridge guide configured to guide the toner cartridge, the toner cartridge guide being disposed on the wall of the main body housing, the toner cartridge guide being different from the drum cartridge guide, wherein, both in the state where the drum cartridge is at the drum first position and in the state where the drum cartridge is at the drum second position, a portion of the drum cartridge is fitted in the drum cartridge guide, and wherein, in a state where the toner cartridge is coupled to the drum cartridge, the drum cartridge is at the drum second position, and the toner cartridge is at the toner second position, the toner cartridge is disengaged from the toner cartridge guide; and the toner cartridge is pivotally movable relative to the drum cartridge between:

a first pivot position at which coupling of the toner cartridge to the drum cartridge is not releasable; and a second pivot position at which the coupling of the toner cartridge to the drum cartridge is releasable.

2. The image forming apparatus according to claim 1, wherein, in a state where the toner cartridge is coupled to the drum cartridge and is at the first pivot position relative to the drum cartridge, the toner cartridge is removable from the main body housing together with the drum cartridge.

3. The image forming apparatus according to claim 1, wherein the drum cartridge further comprises a transfer roller configured to transfer toner on the photosensitive drum onto a sheet.

4. The image forming apparatus according to claim 3, further comprising:

a sheet storage section configured to store therein a sheet, wherein, in the state where the drum cartridge is at the drum first position, the transfer roller is positioned between the photosensitive drum and the sheet storage section.

5. The image forming apparatus according to claim 4, further comprising:

a conveying roller configured to convey a sheet fed from the sheet storage section toward the photosensitive drum in the state where the drum cartridge is at the drum first position; and wherein the drum cartridge further comprises an opposing roller configured to contact the conveying roller in the state where the drum cartridge is at the drum first position.

6. The image forming apparatus according to claim 1, wherein the toner cartridge comprises a sheet guide configured to guide a sheet being conveyed toward the photosensitive drum in a state where the toner cartridge is coupled to the drum cartridge, the drum cartridge is at the drum first position, and the toner cartridge is at the toner first position.

7. The image forming apparatus according to claim 1, further comprising:

a cover configured to open and close the opening, wherein the toner cartridge comprises:

a first storage section configured to store therein toner; and a second storage section configured to store therein toner fed from the first storage section, the second storage section having a discharge port for discharging toner from the second storage section, and wherein, in a state where the toner cartridge is coupled to the drum cartridge, the drum cartridge is at the drum first position, and the toner cartridge is at the toner first position, at least a portion of the first storage section is positioned between the drum cartridge and the cover.

8. The image forming apparatus according to claim 7, wherein the drum cartridge further comprises:

a developing housing configured to store therein toner fed from the toner cartridge; and a developing roller supported by the developing housing, the developing roller being configured to supply toner stored in the developing housing to the photosensitive drum, wherein an amount of toner that can be stored in the second storage section is larger than an amount of toner that can be stored in the developing housing, and wherein an amount of toner that can be stored in the first storage section is larger than the amount of toner that can be stored in the second storage section.

9. The image forming apparatus according to claim 8, wherein the photosensitive drum is rotatable about an axis extending in a first direction, wherein the second storage section has a length in the first direction that is greater than a length of the developing housing in the first direction, and wherein the first storage section has a length in the first direction that is greater than the length of the second storage section in the first direction.

10. The image forming apparatus according to claim 1, wherein the photosensitive drum is rotatable about an axis extending in a first direction, wherein the drum cartridge further comprises:

a first frame supporting one end portion of the photosensitive drum in the first direction;

a second frame supporting another end portion of the photosensitive drum in the first direction;

a third frame having a passage port allowing toner fed from the toner cartridge to pass through the passage port, the third frame being immovable relative to the photosensitive drum;

a developing housing configured to store therein toner that has passed through the passage port, the developing housing being movable relative to the photosensitive drum; and a seal member sealing a space between the developing housing and the third frame, wherein the seal member is positioned around the passage port but apart from the passage port.

11. The image forming apparatus according to claim 10, wherein the drum cartridge further comprises a developing roller configured to supply toner stored in the developing housing to the photosensitive drum, the developing roller being supported by one end portion of the developing housing in a second direction crossing the first direction, wherein the developing housing comprises:

a first wall positioned at one end portion of the developing housing in the first direction, the first wall extending in a third direction crossing both the first direction and the second direction;

a second wall positioned at another end portion of the developing housing in the first direction, the second wall extending in the third direction;

a third wall positioned at one end portion of the developing housing in the third direction, the third wall extending in the first direction; and a fourth wall positioned at another end portion of the developing housing in the third direction, the fourth wall extending in the first direction, and wherein the seal member comprises:

a first seal part positioned between the first wall and the third frame;

a second seal part positioned between the second wall and the third frame;

a third seal part positioned between the third wall and the third frame; and a fourth seal part positioned between the fourth wall and the third frame.

12. The image forming apparatus according to claim 11, wherein the toner cartridge comprises:

a first storage section configured to store therein toner; and a second storage section configured to store therein toner fed from the first storage section, the second storage section having:

a discharge port for discharging toner from the second storage section; and a receiving port positioned apart from the discharge port in the first direction, the receiving port being a port for receiving toner from the developing housing in a state where the toner cartridge is coupled to the drum cartridge and the toner cartridge is at the first pivot position relative to the drum cartridge, wherein the third frame further has a second passage port positioned apart from the passage port in the first direction, the second passage port allowing toner fed from the developing housing to pass through the second passage port in the state where the toner cartridge is coupled to the drum cartridge and the toner cartridge is at the first pivot position relative to the drum cartridge, and wherein the passage port and the second passage port are positioned between the first seal part and the second seal part in the first direction, and are positioned between the third seal part and the fourth seal part in the third direction.

13. The image forming apparatus according to claim 12, wherein the drum cartridge further comprises a conveying member configured to convey toner stored in the developing housing from the passage port toward the second passage port.

* * * * *